(12) United States Patent
Brown

(10) Patent No.: US 11,941,464 B2
(45) Date of Patent: Mar. 26, 2024

(54) SYSTEMS AND METHODS FOR FETCHING, SECURING, AND CONTROLLING PRIVATE CREDENTIALS OVER A DISPARATE COMMUNICATION NETWORK WITHOUT RECOMPILING SOURCE CODE

(71) Applicant: Coinbase, Inc., San Francisco, CA (US)

(72) Inventor: Christopher Brown, Burleson, TX (US)

(73) Assignee: Coinbase, Inc., Oakland, CA (US)

( * ) Notice: Subject to any disclaimer, the term of this patent is extended or adjusted under 35 U.S.C. 154(b) by 94 days.

(21) Appl. No.: 17/678,698

(22) Filed: Feb. 23, 2022

(65) Prior Publication Data

US 2022/0283886 A1    Sep. 8, 2022

Related U.S. Application Data

(60) Provisional application No. 63/153,782, filed on Feb. 25, 2021.

(51) Int. Cl.
 *G06F 9/54* (2006.01)
 *G06F 9/445* (2018.01)
 *G06F 16/14* (2019.01)

(52) U.S. Cl.
 CPC .......... *G06F 9/547* (2013.01); *G06F 9/44505* (2013.01); *G06F 16/148* (2019.01)

(58) Field of Classification Search
 CPC .... G06F 9/547; G06F 9/44505; G06F 16/148; G06F 21/6236; H04L 9/3247; H04L 2209/56; H04L 9/50; H04L 67/34; H04W 12/068; H04W 12/10
 See application file for complete search history.

(56) References Cited

U.S. PATENT DOCUMENTS

| | | | |
|---|---|---|---|
| 2012/0290560 A1* | 11/2012 | Das ........................ | G06F 8/71 707/769 |
| 2016/0277439 A1* | 9/2016 | Rotter ................. | H04L 63/0861 |
| 2020/0021569 A1* | 1/2020 | Simons ................... | H04L 63/12 |
| 2021/0103582 A1* | 4/2021 | Wentworth ......... | G06F 16/2365 |
| 2022/0198044 A1* | 6/2022 | Madhavan ............ | G06F 16/217 |

* cited by examiner

*Primary Examiner* — Kevin L Young
*Assistant Examiner* — Phuong N Hoang
(74) *Attorney, Agent, or Firm* — Perkins Coie LLP

(57) ABSTRACT

In some embodiments, methods and systems use a client application that resides on a client device (e.g., comprising private and secure access credentials). Using the client application, a user may authorize and/or accept a plurality of configuration files. Upon acceptance, the client application is capable of connecting to any interface predefined in the plurality of configuration files (e.g., corresponding to a predetermined list of network systems). The configuration files is downloaded from a package repository or included during software installation.

20 Claims, 18 Drawing Sheets

```
1   version: 1.0
2   provider_name: test
3   base_api_url: 'https://api.example.com/v1/me'
4   
5   objects:
6     balance:
7       type: json
8       fields:
9         currency_code: string
10        amount: float
11        available: float
12      maps_to: balance
13      mapping:
14        currency_code: ticker
15        amount: amount
16        available: available_amount
17  
18  resources:
19    balances:
20      path: /getbalance
21      method: GET
22      auth:
23        type: signature
24        algo: HMAC
25        strength: 256
26        secret_reference: request_data.secret_token
27        sig_payload:
28          - timestamp_ms
29          - method
30          - path
31      headers:
32        ACCESS-KEY: request_data.public_token
33        ACCESS-SIGN: auth_output
34        ACCESS-TIMESTAMP: timestamp_ms
35      output:
36        type: array
37        items: balance_object
38  
```

FIG. 13

SYSTEMS AND METHODS FOR FETCHING, SECURING, AND CONTROLLING PRIVATE CREDENTIALS OVER A DISPARATE COMMUNICATION NETWORK WITHOUT RECOMPILING SOURCE CODE

CROSS-REFERENCE TO RELATED APPLICATION

This application claims the benefit of priority of U.S. Provisional Application No. 63/153,782, filed Feb. 25, 2021. The content of the foregoing application is incorporated herein in its entirety by reference.

BACKGROUND

In recent years, the use of blockchains and blockchain technology has exponentially increased. A blockchain comprises a list of records, called "blocks," that are "chained" together using cryptography. Each block may comprise data that is computed using a one-way function (e.g., a function that is practically impossible to invert or reverse-compute) of a previous block, a timestamp (e.g., indicating a creation and/or modification time), and additional data (e.g., transactional or operational data related to blockchain operations).

While publicity for blockchains and blockchain technology has been concentrated on its use for cryptocurrencies and smart contracts, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Methods and systems are described herein for novel uses and/or improvements to fetching, securing, and controlling private credentials over a disparate communication network without recompiling source code, which, in some embodiments, may utilize blockchain technology. As one example, methods and systems are described herein for mechanisms that allow the sharing of private data between remote parties without sharing the credentials that control the access to that data. In particular, the methods and systems described herein provide a client application that allows the sharing of private data between remote parties without sharing the credentials that control the access to that data. To achieve this, the methods and systems use a novel approach to security and data sharing based on the use of configuration files, which does not require source code to be recompiled as private data is requested and shared between new network systems.

The methods and systems described herein therefore present a stark contrast to both conventional thinking toward securing data and conventional systems and mechanisms for doing so. For example, conventional systems rely on specialized protocols (e.g., OAuth2.0), application programming interface (API) keys such as first-party API keys, or data parsing (e.g., screen scraping) to allow the sharing of private data between remote parties. However, each of these conventional mechanisms presents significant drawbacks.

For example, specialized protocols are a first conventional mechanism for allowing third parties to gain access to a user's private data in a secure manner. For example, Open Authorization Framework 2.0 (OAuth2.0) is a protocol that allows a user to grant a third-party website or application access to the user's protected resources, without necessarily revealing their long-term credentials or even their identity. However, the usage of OAuth2.0 gives rise to the risk of token leakage (e.g., determination of a token or fragment by an unauthorized party during use) and token injection (e.g., unauthorized use of a stolen token), either of which may be undetectable.

First-party API keys are a second conventional mechanism for allowing third parties to gain access to a user's private data in a secure manner. In such cases, third parties are able to directly generate secret keys in order to access the user's private data. While such a mechanism may be pragmatic in some scenarios, it relies entirely on the trust and security of the third party.

Finally, a third conventional mechanism for allowing third parties to gain access to a user's private data in a secure manner is the use of screen scraping. In such cases, third parties may use a user's credentials (e.g., login name and password) to access a user's account and parse an account interface to access the private data. The obvious drawback is that the third party is given the credentials and thus granted unfettered access to the user account.

The methods and systems described herein overcome the drawbacks of the conventional systems to allow third parties to gain access to a user's private data in a secure manner. However, the methods and systems provide the additional technical benefit of allowing the sharing of private data between remote parties without sharing the credentials that control the access to that data. For example, as opposed to relying on an authorization protocol and/or a third party directly generating API keys, the methods and systems use a novel configuration protocol that configures a network API of client applications at runtime.

More specifically, the methods and systems rely on the use of a client application that resides on a client device (e.g., comprising private and secure access credentials). Using the client application, a user may authorize and/or accept a plurality of configuration files. Upon acceptance, the client application is capable of connecting to any interface predefined in the plurality of configuration files (e.g., corresponding to a predetermined list of network systems). The configuration files may be downloaded from a package repository or may be included during software installation.

Notably, the client application executes the configuration at runtime, allowing the compiled application itself to ossify the source code around its core behavior. This is in contrast with preloading or compiling configurations into the client application directly, which would require a new build and new distribution for any new network system (and its respective interface) that is added. By doing so, the client application does not require source code to be recompiled as private data is requested and shared between new network systems. For example, if the client application preloaded configurations directly, the source for the client application would require continuous recompiling, which would require not only additional processing (e.g., converting native source code as provided by the application developer into code that may be executed on a virtual machine), but also additional resources (e.g., a development kit for the application to use during recompiling).

Having alleviated this novel problem specific to using configuration files for sharing of private data between remote parties, the methods and systems may now provide the exchange of data without sharing the credentials that control the access to that data by configuring a client application with a distinct configuration protocol for accessing and securing the sharing of private data in which the user's credentials and means for controlling the access to the data remain on the user device.

In some aspects, methods and systems for fetching, securing, and controlling private credentials over a disparate communication network without recompiling source code by configuring, at runtime, a network application programming interface (API) of client applications executing on user devices are described. For example, the system may receive, at a user device from a repository network system, a first request for user data from a source network system, wherein the user data is accessible to the user device based on access credentials implemented on the user device. The system may parse, by a client application on the user device, a plurality of configuration files to determine a corresponding plurality of source APIs, wherein each of the plurality of source APIs corresponds to a respective source network system external to the user device. The system may determine a source API of the plurality of source APIs based on a configuration file of the plurality of configuration files that corresponds to the source API. The system may configure a network API of the client application based on the configuration file. The system may establish successful communicable connectivity with the source network system using the source API. The system may generate, by the client application, a second request based on the first request, the access credentials, and the source API. The system may transmit, by the client application, the second request for the data to the source network system. The system may, in response to transmitting the second request for the data to the source network system, receive first response data from the source network system. The system may generate, based on the configuration file, second response data. The system may transmit the second response data to the repository network system.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 13 shows an example YAML structured configuration file.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Methods and systems for fetching, securing, and controlling private credentials over a disparate communication network without recompiling source code by configuring, at runtime, a network application programming interface (API) of client applications executing on user devices are described. For example, methods and systems for a configurable API client application, accessing and securing private data (e.g., financial data) and credentials (e.g., access credentials), are described. For example, systems for financial data access as disclosed herein reduce the amount of sensitive data (e.g., access credentials) introduced in a financial ecosystem where service providers need access to financial information, and decentralizes the storage of personally identifiable information (PII) and other sensitive data, which collectively reduces the attack surface of any one service provider. Third-party service provider systems can employ the systems and methods disclosed herein to validate the accuracy of data provided by financial systems, to request certain actions be taken or more data provided through bi-directional communication channels, and/or the like. Additionally, aspects disclosed herein include the ability to configure the client with the ability to interface with network APIs without recompiling the source code of the client.

Figure 1A:
FIG. 1A illustrates an example interface for connecting the client application to a service provider system, in accordance with one or more embodiments.
Figure 1B:
FIG. 1B illustrates an example interface of a completion screen after successfully connecting with a valid service provider system, in accordance with one or more embodiments.

FIGS. 1A-F illustrate an interface of a client application executing on a mobile device/smartphone for accessing and securing data and access credentials of a user of the client application. In some embodiments, the purpose may include aggregating multiple financial provider systems via a communication network. FIG. 1A illustrates an example interface for connecting the client application to a service provider system. For example, a REST API client application may be configured with configuration files to execute requests with specified network systems. These network systems may include source network systems (e.g., network systems that provide data) and repository network systems (e.g., network systems that receive/store/aggregate data). In some embodiments, a source network system may comprise a financial provider system, whereas a repository network system may comprise a data aggregation service. FIG. 1B illustrates an example interface of a completion screen after successfully connecting with a valid service provider system.

For example, a user/asset owner may generate access credentials (e.g., such as an API key or password) to their account on a financial provider's system. The user (or user device, which is referred to herein collectively) may continue to generate access credentials to an arbitrary number of financial provider systems where they hold an account.

The user may provide these credentials to the client application (e.g., a software application implemented on the user device) which encrypts and stores the access credentials locally on the user device. The user may use the client application to request their financial information, such as balances and transactions, or perform an action, such as a transfer or other blockchain operation, with the target financial provider's system (e.g., a bank server) via an interface embedded in the client application which utilizes the access credentials provided. The authorized request may be received at the financial provider's system directly from the client application. The financial provider system may validate the request, take appropriate action, and/or respond to the client application/system with a signature validating the response using asymmetric cryptography or like methods. For example, in some embodiments, the access credentials may include private and/or partial private keys as described herein. Furthermore, the source network system and/or the repository network system may comprise a network system based upon a blockchain network. For example, a repository network system may comprise a blockchain indexer (e.g., as described in FIG. 5 below).

Figure 1C:
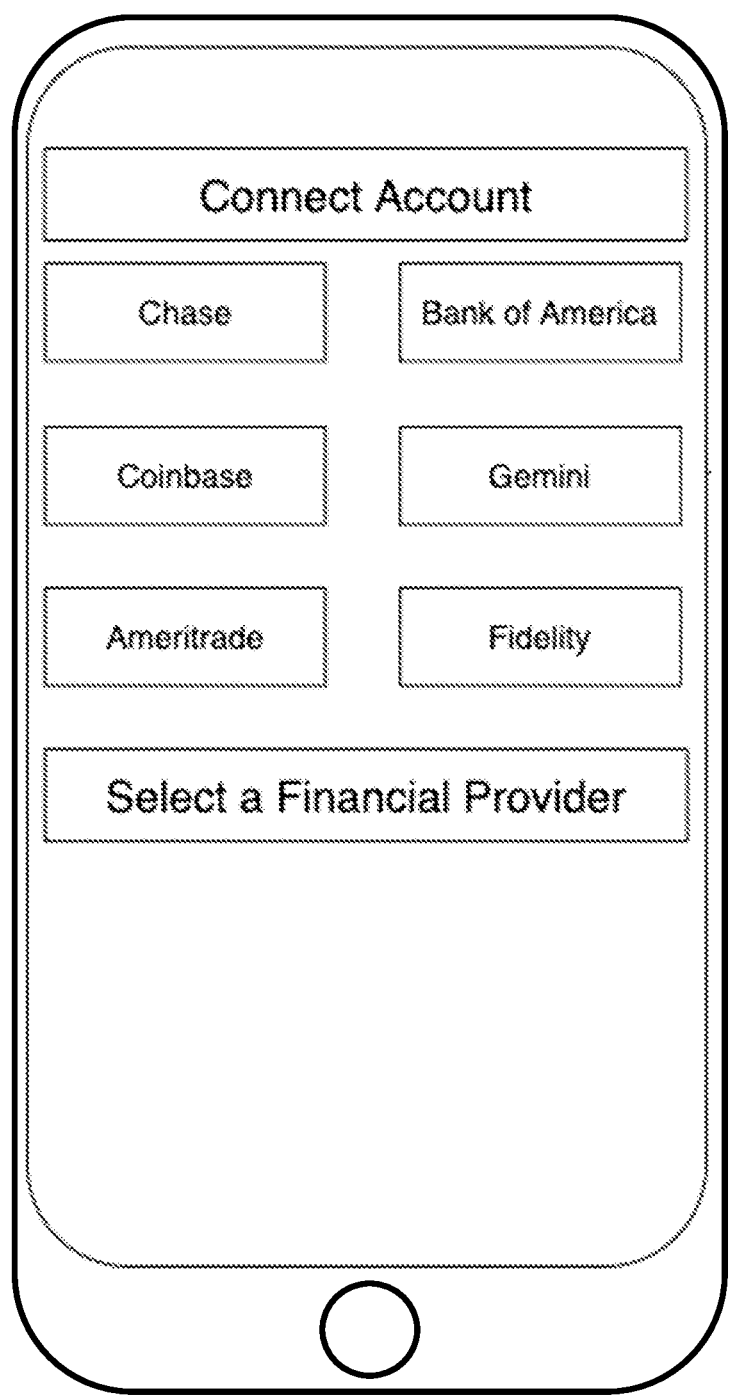
FIG. 1C illustrates an example interface for selecting one or more financial provider systems which may hold one of the user's financial accounts, in accordance with one or more embodiments.
Figure 1D:
FIG. 1D illustrates an example interface for providing credentials to the local user device which will be used to access a user account within the previously selected financial provider system in FIG. 1C, in accordance with one or more embodiments.

The user may allow the user device to forward a response to the repository network system such as an arbitrary service provider's system (e.g., a financial portfolio aggregator software) via an explicit approval in either the client application's settings, or on demand. For example, FIG. 1C illustrates an example interface for selecting one or more financial providers which may hold one of the user's financial accounts. FIG. 1D illustrates an example interface for providing credentials to the local client system which will be used to access a user account within the previously selected financial provider system in FIG. 1C.

The repository network system may validate the data and signature sent to the client application by the financial provider system and utilize the data to provide its respective services. The original access credentials used to fetch this data may never leave the user device/application, and only service provider systems approved in the client application by the user eventually receive the response data.

Figure 1E:
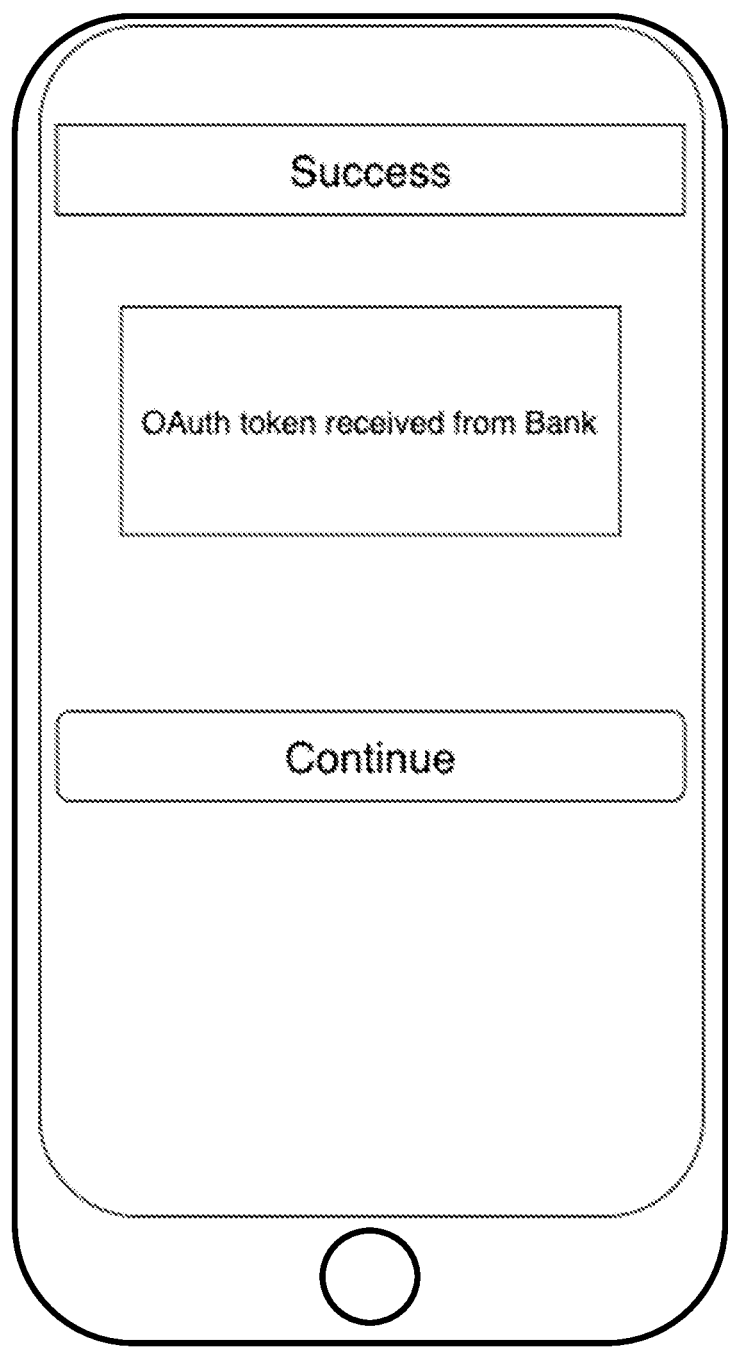
FIG. 1E illustrates an example interface of a successful response from the financial provider system after providing valid credentials for a user account as illustrated in FIG. 1D, in accordance with one or more embodiments.
Figure 1F:
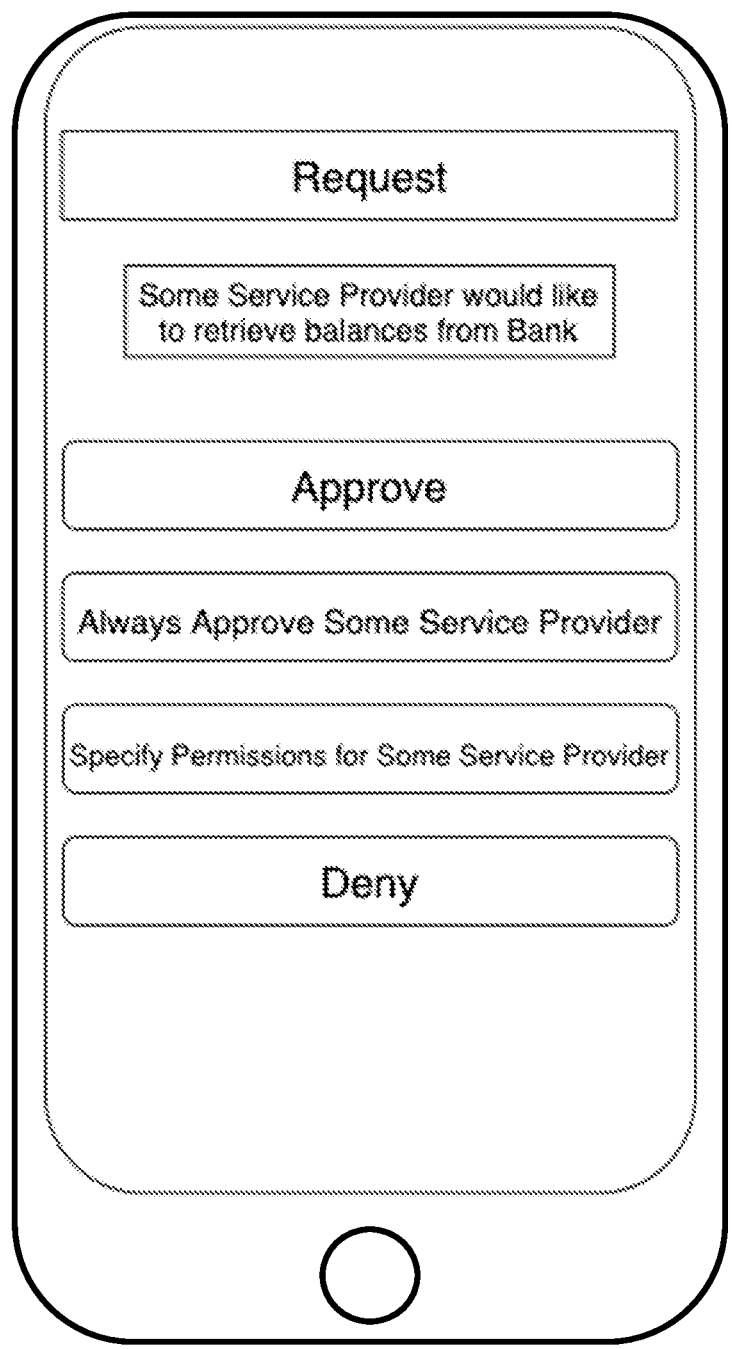
FIG. 1F illustrates an example interface of an inbound request from the previously connected service provider system, in accordance with one or more embodiments.

FIG. 1E illustrates an example interface of a successful response from the financial provider system after providing valid credentials for a user account as illustrated in FIG. 1D. As shown, the financial provider system may respond with an OAuth token which will be stored by the local client system to be used later when requesting data from the financial provider system. FIG. 1F illustrates an example interface of an inbound request from the previously connected service provider system (as shown in FIG. 1A). As shown, the user may be asked to approve a request for balance information from the financial provider account accessed in FIG. 1D. If approved, the user device may fetch the information directly from the financial provider system using the OAuth credential received (as shown in FIG. 1E), and return the balance information to the service provider system without providing the access credentials (i.e., the OAuth credential) to the service provider system or any other entity. The user may also deny the request directly, or scope the request to a specific subset of data during this workflow.

Also disclosed herein are methods and systems for configuring a client application with a distinct configuration protocol for accessing and securing financial data and credentials for the purpose of aggregating multiple financial provider systems via a communication network. It also provides a secure mechanism for financial provider systems to validate the information provided to third parties, such as service provider systems, without transmitting any sensitive information. Further, ways for the client application to authorize recipients of the financial data are disclosed. A client application may reside on a user's local user device and may be capable of interfacing with an arbitrary number of financial provider systems. The client application may be capable of connecting to any interface predefined in configuration files which can be fed to the client application without recompiling the source code of the client application. The client application may be capable of obtaining access credentials to any of these financial provider systems in coordination with the asset owner who wishes to approve access to the client application. The client application encrypts and stores all access credentials locally and does not pass them outside of the user device.

The user may approve the client application to also connect with arbitrary service provider systems that wish to receive financial data for the purpose of their service(s). Using the client application and stored access credentials, the user sends requests for the financial data to the approved financial provider systems. The user device receives the arbitrary (i.e., encrypted, hashed) responses to the requests as response data. The responses from the financial provider systems may also include a "fingerprint" which validates that the response data was in fact sent from the target financial provider system and the response data is accurate. The client application may then forward the response data with the fingerprint over a communication network to arbitrary service systems capable of interfacing with the client process, excluding any access credentials from this communication. The client application may also be capable of receiving requests for financial data from the service provider systems to forward to a connected financial provider system.

The repository network systems (or service provider systems) may include servers and have interfaces capable of receiving the response financial data (e.g., hash/encrypted data), and financial provider verification of this data (e.g., a digital signature), from the client application. The service provider system may receive this response data and complete the validation of this response data via direct communication with the financial provider (e.g., without the involvement of the client application/system). The service provider system may then proceed to use the verification process result and response data as it deems necessary to complete its service to the user.

Figure 2:
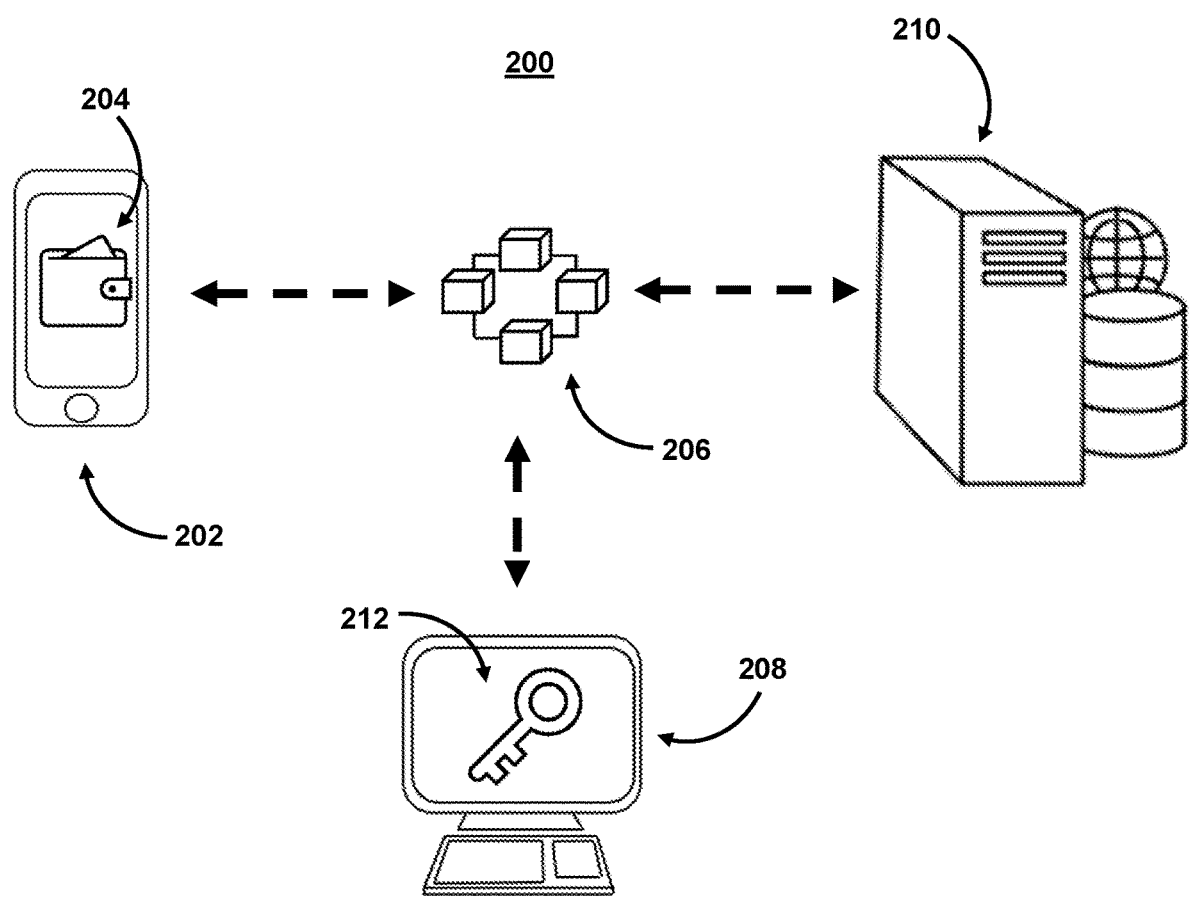
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to fetch, secure, and/or control private credentials over a disparate communication network in some embodiments.

FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to fetch, secure, and control private credentials over a disparate communication network, and the user interface may display content related to fetching, securing, and controlling private credentials over a disparate communication network. As referred to herein, "content" should be understood to mean an electronically consumable user asset, representations of goods or services (including nonfungible tokens), internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing device, including, but not limited to, a laptop computer, a tablet computer, a handheld computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to fetching, securing, and/or controlling private credentials over a disparate communication network. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a nonfungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or a digital signature. For example, system 200 may use cryptographic systems for conducting blockchain operations such as fetching, securing, and controlling private credentials over a disparate communication network. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation and thus this mechanism provides a manner for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
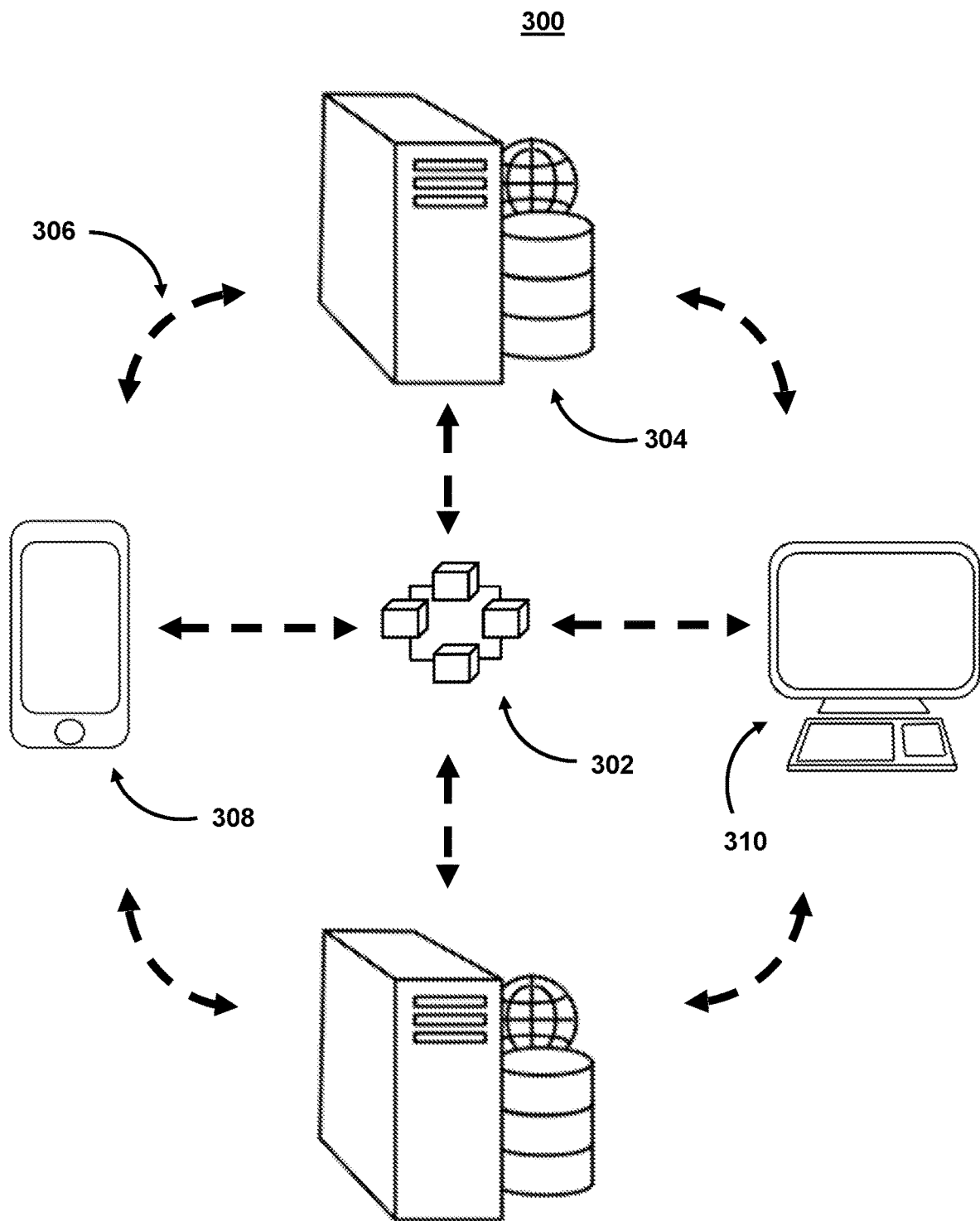
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may perform fetching, securing, and controlling of private credentials over a disparate communication network within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need for any intermediaries or central authorities.

In some embodiments, the user devices of system 300 may comprise one or more cloud components. For example, cloud components may be implemented as a cloud computing system and may feature one or more component devices.

It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to fetching, securing, and controlling private credentials over a disparate communication network within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
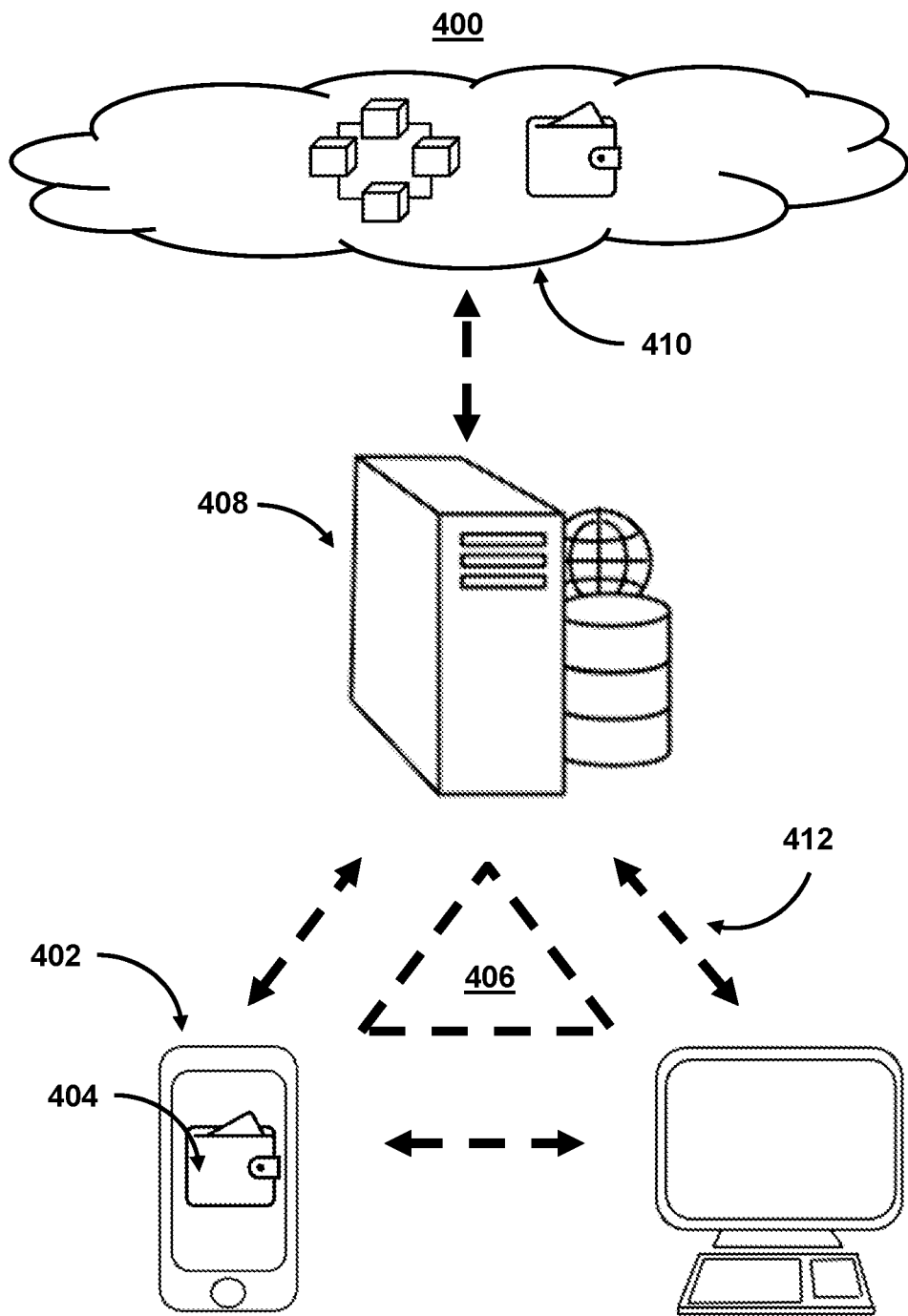
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to fetch, secure, and control private credentials over a disparate communication network. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate fetching, securing, and controlling private credentials over a disparate communication network. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, the API layer 406 may maintain internal records and balances without relying on external verification (e.g., which may take up to ten minutes depending on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PUP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and distributed denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410 (e.g., as described in FIG. 5), and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. While conventional systems may rely on directly referencing blockchain 410, since the blockchain is the source of truth for the system, however, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in the case of forks, system 400 performs some internal remediation on user accounts, which is enabled by system 400 maintaining a layer of insulation, from the blockchain, for remedial blockchain operations. For example, system 400 may have a separate storage, protected by the second ledger (e.g., a ledger service), for reads, and by a transfer service, for writes, that reflects the state of the blockchain that is relevant for system 400 purposes.

In some embodiments, the system may also use one or more application binary interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which is executed on the EVM. Smart contracts written in high-level languages like Solidity or Vyper may be compiled in EVM-executable bytecode by the system. Upon deployment of the smart contract, the bytecode is stored on the blockchain and is associated with an address. To access functions defined in high-level languages, the system translates names and arguments into byte representations for byte code to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parseable format, performing translations between human-intended method calls and smart-contract operations discoverable and reliable.

For example, ABI defines the methods and structures used to interact with the binary contract similar to an API, but on a lower level. The ABI indicates the caller of the function to encode (e.g., ABI encoding) the needed information like function signatures and variable declarations in a format that the EVM can understand in order to call that function in bytecode. ABI encoding may be automated by the system using compilers or wallets interacting with the blockchain.

Figure 5:
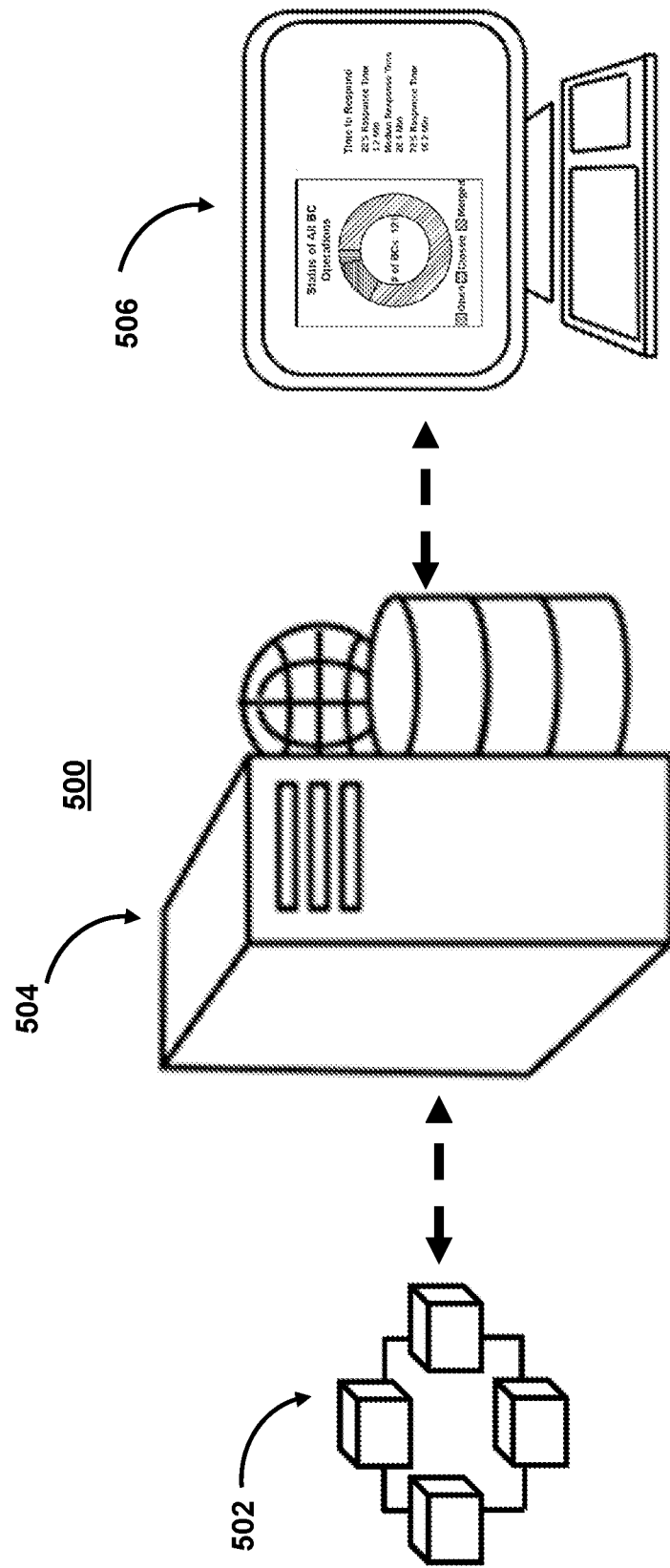
FIG. 5 shows an illustrative diagram for a blockchain indexer, in accordance with one or more embodiments.

FIG. 5 shows an illustrative diagram for a blockchain indexer, in accordance with one or more embodiments. For example, in some embodiments, the system may use indexer service 500 to perform fetching, securing, and controlling of private credentials over a disparate communication network. Indexer service 500 may fetch raw data (e.g., data related to a current state and/or instance of blockchain 502) from a node of a blockchain network (e.g., as described above). Indexer service 500 may then process the data and store it in a database and/or data structure in an efficient way to provide quick access to the data. For example, indexer 504 may publish and/or record a subset of blockchain operations that occur for blockchain 502. Accordingly, for subsequent blockchain operations, indexer service 500 may reference the index at indexer 504 as opposed to a node of blockchain 502 to provide various services at user device 506.

For example, indexer 504 may store a predetermined list of blockchain operations to monitor for and/or record in an index. These may include blockchain operations (e.g., "operation included," "operation removed," "operation finalized") related to a given type of blockchain operation (e.g., "transaction," "external transfer," "internal transfer," "new contract metadata," "ownership change," etc.) as well as blockchain operations related to a given protocol, protocol subgroup, and/or other characteristic (e.g., "ETH," "ERC20," and/or "ERC721"). Additionally and/or alternatively, the various blockchain operations and metadata related to those blockchain operations (e.g., block designations, user accounts, timestamps, etc.) as well as an aggregate of multiple blockchain operations (e.g., total blockchain operations amounts, rates of blockchain operations, rate of blockchain updates, etc.) may be monitored and/or recorded.

Indexer 504 may likewise provide navigation and search features (e.g., support Boolean operations) for the indexed blockchain operations. In some embodiments, indexer 504 may apply one or more formatting protocols to generate representations of indexed blockchain operations in a human-readable format. In some embodiments, indexer 504 may also tag blockchain operations based on whether the blockchain operation originated for a local user account (e.g., a user account corresponding to a custodial account) and/or a locally hosted digital wallet. Indexer service 500 may determine whether a blockchain operation contains relevant information for users of indexer service 500 by storing information about whether an address is an internal address of indexer service 500 or one used in a digital wallet hosted by a predetermined wallet service.

Figure 6:
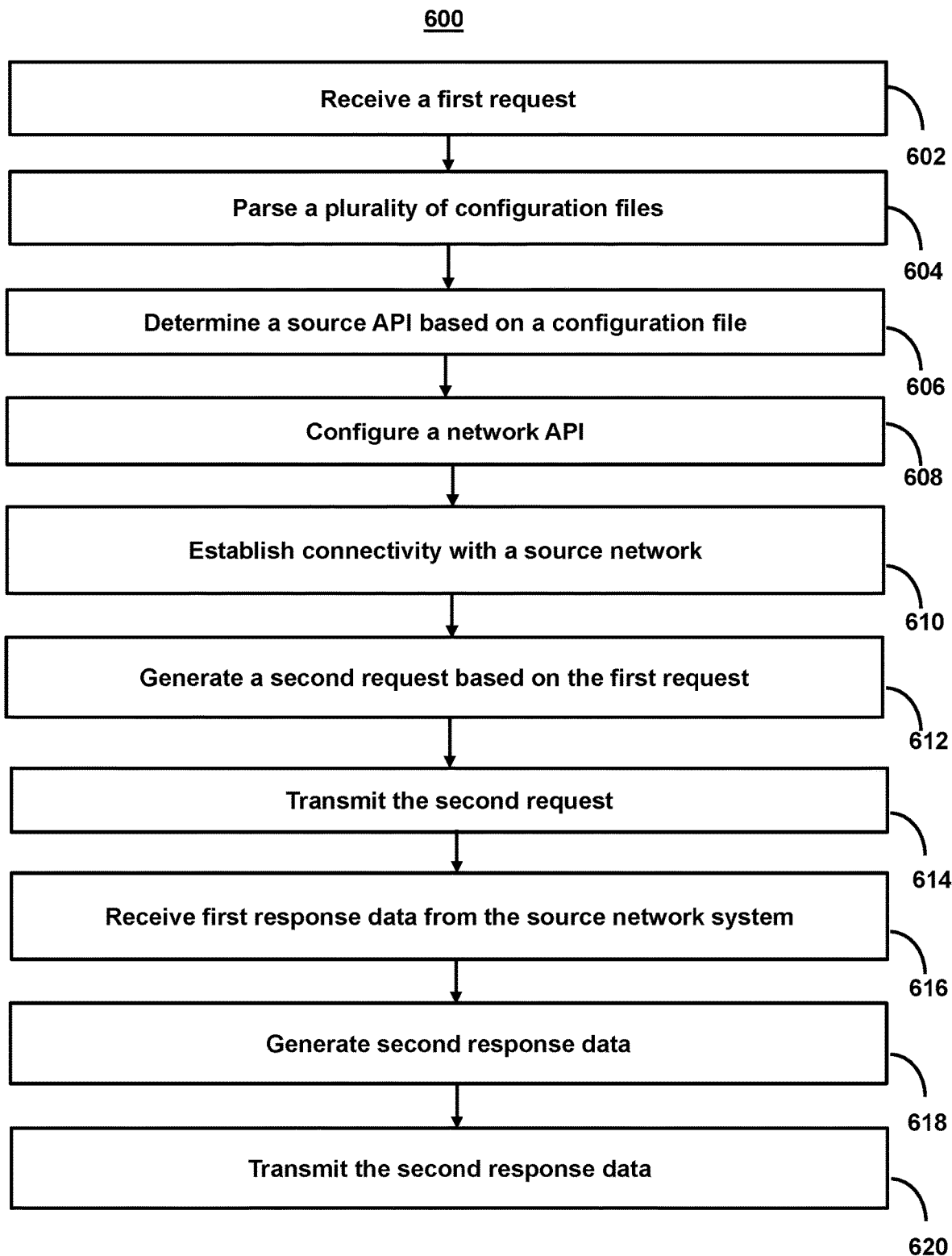
FIG. 6 shows a flowchart of the steps involved in fetching, securing, and controlling private credentials over a disparate communication network without recompiling source code by configuring, at runtime, a network application programming interface (API) of client applications executing on user devices, in accordance with one or more embodiments.

FIG. 6 shows a flowchart of the steps involved in fetching, securing, and controlling private credentials over a disparate communication network, in accordance with one or more embodiments. For example, the system may use process 600 (e.g., as implemented on one or more system components described above) in order to fetch, secure, and/or control private credentials over a disparate communication network without recompiling source code by configuring, at runtime, a network API of client applications executing on user devices. The system may exchange data without sharing the credentials that control the access to that data by configuring a client application with a distinct configuration protocol for accessing and securing the sharing of private data in which the user's credentials and means for controlling the access to the data remain on the user device.

The client application executes the configuration at runtime allowing the compiled application itself to ossify the source code around its core behavior. That is, the source code of the user device does not include a specification of any source API of the plurality of source APIs. By doing so, the client application does not require source code to be recompiled as private data is requested and shared between new network systems. For example, if the client application preloaded configurations directly, the source for the client application would require continuous recompiling, which would require not only additional processing (e.g., converting native source code as provided by the application developer into code that may be executed on a virtual machine), but also additional resources (e.g., a development kit for the application to user during recompiling).

The client application can initially (e.g., upon installation, upon being launched or activated for the first time, etc.) have no configuration files to interface with any of the financial provider systems FS1-FSn, and/or with any of the service provider systems SS1-SSn. The client application can then receive (e.g., over a network) configuration files which define the interfaces the client application can employ/execute to communicate with the financial provider systems FS1-Fsn over a network. For example, the configuration files can be downloaded from a package repository, and/or a distributor of the client application can include an initial set of configuration files, which is loaded during software installation. In some cases, the user can develop configuration files and load into the client application. In this manner, configuration of the client application at runtime allows the compiled application itself to ossify the source code around its core behavior. This is in contrast with preloading, or compiling configurations into the client application, which would require a new build and new distribution for any new provider(s) and interface(s) added.

In some cases, the client application can include (as separate configuration files) configurations for well-known financial and/or service provider systems, such as major financial institutions and data aggregation providers. Such interfaces/configuration files would not be compiled into the source code of the client application, but rather loaded at runtime.

The configuration files could be of any structured data format such as, for example, 'YAML, Ain't Markup Language' (YAML), JavaScript Object Notation (JSON), and/or the like. The network interface of each of the financial provider systems FS1-FSn can independently execute any valid network protocol such as, for example, a standard RESTful/REST API with structured JSON objects, a Remote Procedure Call (RPC) with predefined data structures, and/or the like. In this manner, the client application parses the structured data from the configuration file at runtime and executes requests to the configured interfaces of the financial provider systems FS1-FSn without requiring that they be coded directly into the client application and without having to recompile the source code of the client application, without reinstalling or rebooting the client application on the user device, and/or the like.

At step 602, process 600 (e.g., using one or more components described above) receives a first request. For example, the system may receive, at a user device from a repository network system, a first request for user data from a source network system, wherein the user data is accessible to the user device based on access credentials implemented on the user device. For example, the repository network system and the user device may be communicably coupled to a plurality of source network systems.

In some embodiments, a user account may correspond to a first cryptography-based storage application. For example, a server may store one or more user accounts, including the first user account that corresponds to the first cryptography-based storage application, and a platform service (e.g., hosted on the server) may receive, from the first user device, the first user request to access the first user account or data in the user account. In some embodiments, the first cryptography-based storage application may be used to perform a plurality of blockchain operations across a computer network based on a combined use of a first public key, a first partial private key, and a second partial private key. In some embodiments, the second partial private key may not be accessible to a platform service facilitating the first cryptography-based storage application. For example, the server hosting the platform service may store the first partial private key and may not store the second partial private key. By doing so, the system may ensure that a user retains some autonomy in conducting blockchain operations and that the digital assets are secured. For example, the system may generate the first partial key and the second partial key. For example, the system may receive a public key encryption for the first device. The system may then generate a ciphertext for the public key encryption. The system may split the private key encryption for the first device to generate the first partial key and the second partial key. By doing so, the partial private keys remain hidden even though they are used for the digital signing process.

In some embodiments, the first cryptography-based storage application may be a non-custodial cryptography-based storage application. That is, the first cryptography-based storage application may be a separate, stand-alone application that allows users to store, or maintain custody of, their own crypto assets, and explore the decentralized web with a decentralized application browser. The first cryptography-based storage application may be a stand-alone application that does not require interaction with a user account (e.g., an account from a blockchain services provider, centralized brokerage, and/or exchange). The first cryptography-based storage application may allow users to manage their own private keys and store their crypto assets directly on their devices, not with a centralized brokerage or exchange.

At step 604, process 600 (e.g., using one or more components described above) parses a plurality of configuration files. For example, the system may parse, by a client application on the user device, a plurality of configuration files to determine a corresponding plurality of source APIs, wherein each of the plurality of source APIs corresponds to a respective source network system external to the user device. For example, the plurality of API configuration files may be received during software installation of the client application on the client device. For example, the system may receive the client application. The system may then receive the plurality of API configuration files.

In some embodiments, the system may automatically search for a configuration file based on receiving the first request. For example, the system (e.g., the client application) may search via a network that the client application is coupled to, for valid configuration files, wherein the plurality of API configuration files is received in response to the searching.

At step 606, process 600 (e.g., using one or more components described above) determines a source API based on a configuration file. For example, the system may determine a source API of the plurality of source APIs based on a configuration file of the plurality of configuration files that corresponds to the source API. For example, the configuration file may comprise a hierarchical list of variables for generating the second request based on the first request, and wherein the variables comprise key value pairs that belong to a RuntimeConfig resource for the client application. The configuration file may set, get, and/or watch variable values to communicate information to one or more applications and/or network systems, signal a completed state, and/or send notification of data changes. Furthermore, as variables are hierarchical, the variable keys may have several levels.

At step 608, process 600 (e.g., using one or more components described above) configures a network API. For example, the system may configure a network API of the client application based on the configuration file. For example, the network API configuration may assign network settings, policies, flows, and controls.

At step 610, process 600 (e.g., using one or more components described above) establishes connectivity with a source network. For example, the system may establish successful communicable connectivity with the source network system using the source API. In such cases, the system may begin transferring data and/or initiate the sharing of data.

At step 612, process 600 (e.g., using one or more components described above) generates a second request based on the first request. For example, the system may generate, by the client application, a second request based on the first request, the access credentials, and the source API. The second request may comprise a request from the user device for account data and access credentials associated with an account of the user with the source network system.

At step 614, process 600 (e.g., using one or more components described above) transmits the second request. For example, the system may transmit, by the client application, the second request for the data to the source network system.

At step 616, process 600 (e.g., using one or more components described above) receives first response data from the source network system. For example, the system may receive first response data from the source network system in response to transmitting the second request for the data to the source network system.

At step 618, process 600 (e.g., using one or more components described above) generates second response data. For example, the system may generate, based on the configuration file, second response data.

At step 620, process 600 (e.g., using one or more components described above) transmits the second response data. For example, the system may transmit the second response data to the repository network system. The repository network system may then validate an accuracy and a source of the second response data without exchanging the access credentials with the source network system. For example, the repository network system may validate the accuracy and the source of the second response data via direct communication to the source network system, and the first response data may comprise a unique fingerprint that validates an accuracy and a source of the first response data.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
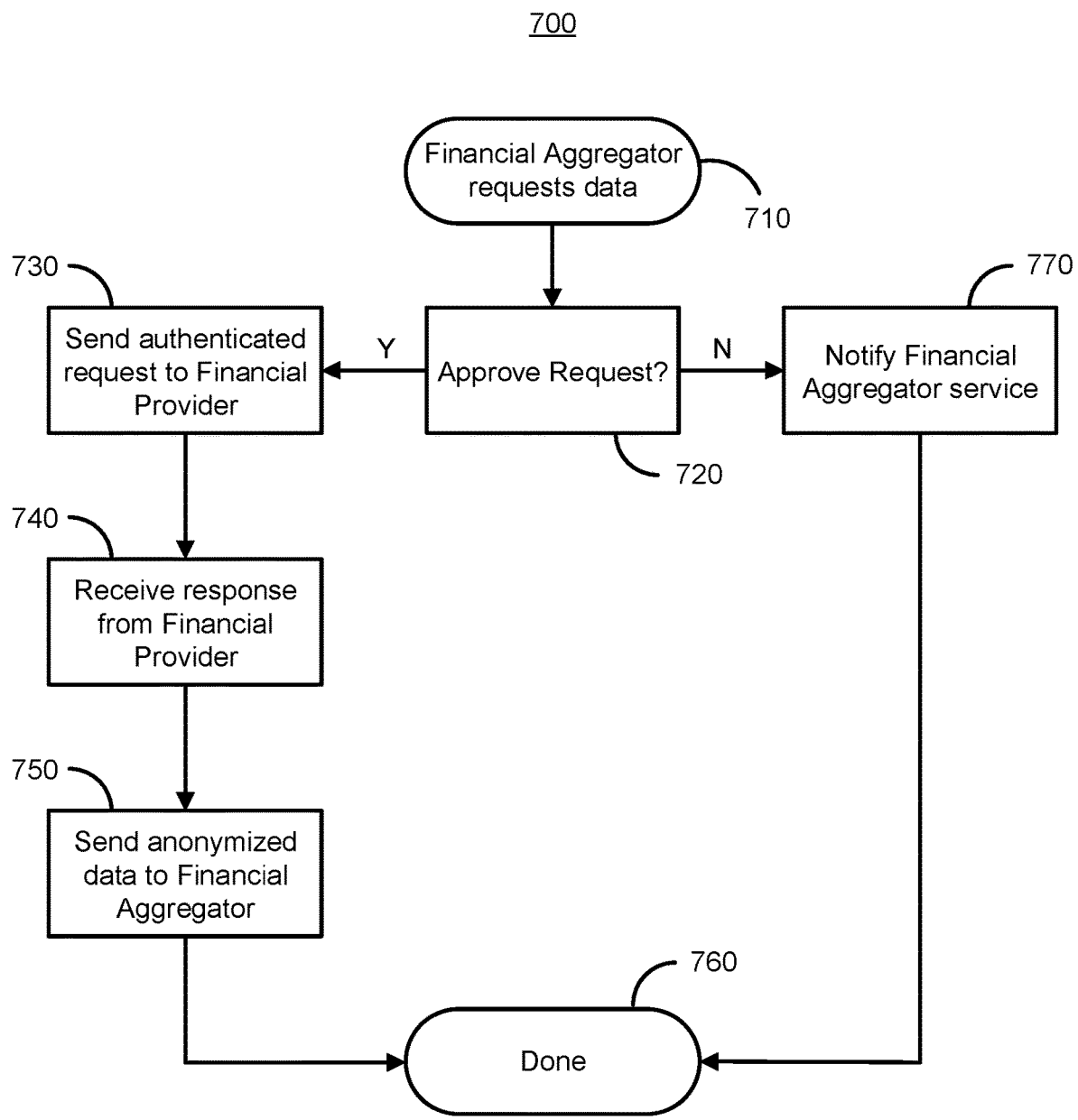
FIG. 7 shows a flowchart of the steps involved in processing a request received at a client system from a service provider system, in accordance with one or more embodiments.

FIG. 7 shows a flowchart of the steps involved in processing a request received at a client system from a service provider system, in accordance with one or more embodiments. For example, FIG. 7 illustrates process 700 for processing a request received at a client system from a service provider system, and the subsequent flows after the approval or denial chosen in FIG. 1F.

For example, FIG. 1F illustrates an example interface of the client application and shows, to the user, that the client application has received a request for information (e.g., step 710) from a certain service provider system ("Some Service Provider," e.g., the system SS1). This request can be generated by the service provider system after the user takes an action in some third-party application. For instance, the user wishes to connect their bank account to a budgeting application (e.g., the retail application RA1) on their phone (e.g., the user device), and the budgeting application uses Some Service Provider as their data aggregation service. When the user triggers the connection request in the budgeting application, the request is forwarded from the budgeting application to Some Service Provider, then from Some Service Provider to the client application for presentation to the user (e.g., step 720). The user can approve the request from Some Service Provider via the interface of FIG. 1F. The client application then sends a request to the selected financial provider system (e.g., step 730) based on the request from Some Service Provider, receives the response data (e.g., a hash and a digital signature, e.g., step 740), and sends the anonymized response data to Some Service Provider's system (e.g., step 750). The process 700 ends at step 760. If the user does not approve the request, Some Service Provider is notified at step 770, and the process ends at step 760.

Figure 8:
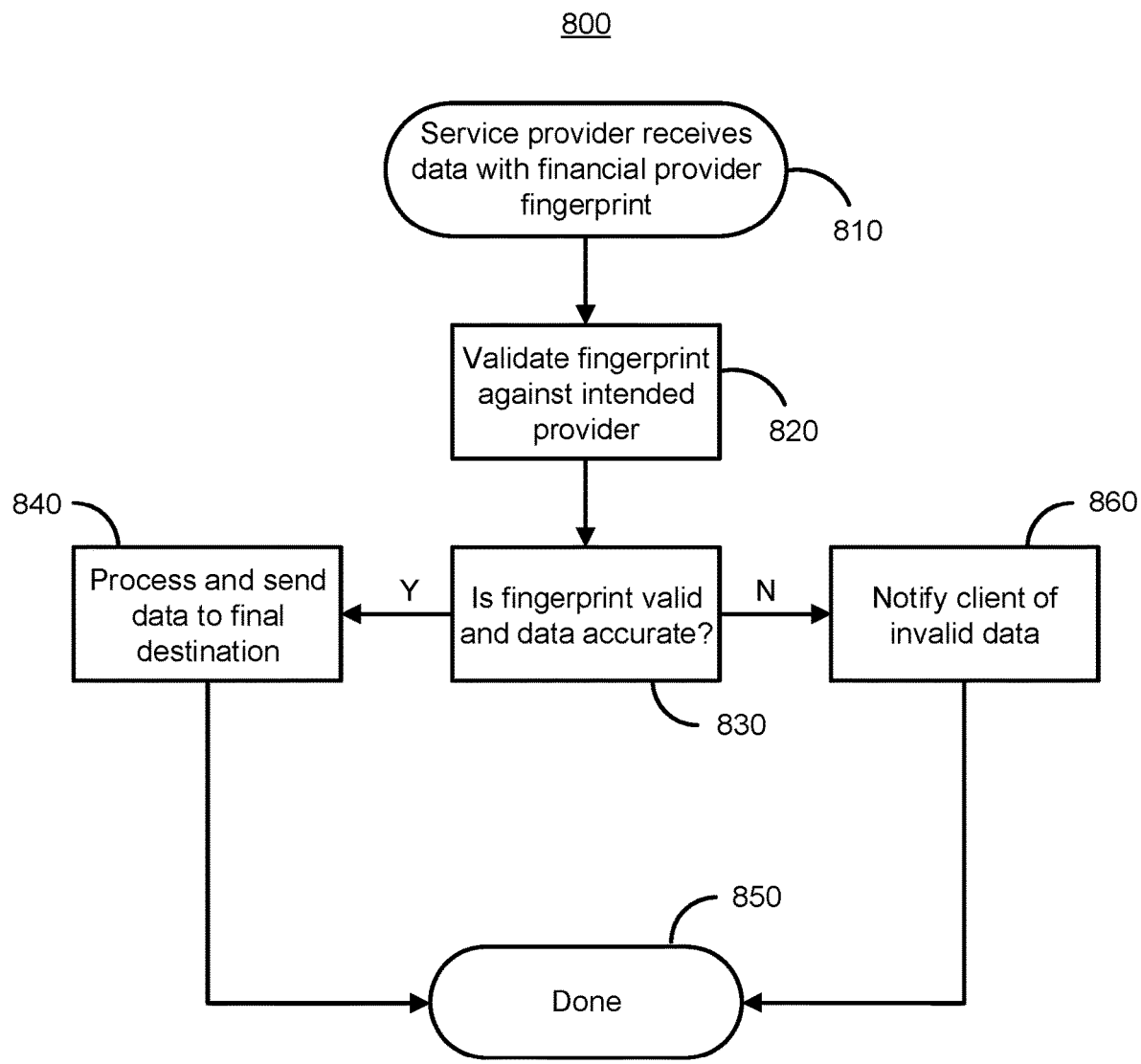
FIG. 8 shows a flowchart of the steps taken by a service provider system, after the service provider system receives anonymized data, in accordance with one or more embodiments.

FIG. 8 shows a flowchart of the steps taken by a service provider system, after the service provider system receives anonymized data, in accordance with one or more embodiments. For example, FIG. 8 illustrates a method of a service provider system, after the service provider system receives anonymized data (e.g., financial data) from a client system. Here, the service provider system receives a unique signature, or fingerprint, with the data that is generated by the financial provider system. The service provider system validates this signature (e.g., verifies that the signature is one that can only be generated and signed by that specific financial provider system).

For example, FIG. 8 illustrates an example process 800 for the service provider system (e.g., the system SS1) after receiving the response data from the client application at step 810. At step 820, the service provider validates the fingerprint/digital signature received against the mechanism used for the intended financial provider system (e.g., using a public key associated with that financial provider system) and user. At step 830, a check is performed to determine whether the hash is accurate and the digital signature is valid. Upon successful validation, the service provider has confidence in the hash/response data it is receiving and processes it for the intended purpose at step 840. The process 800 ends at step 850. If the validation at step 830 is unsuccessful, the client application is informed at step 860, and the method ends at step 850.

Figure 9:
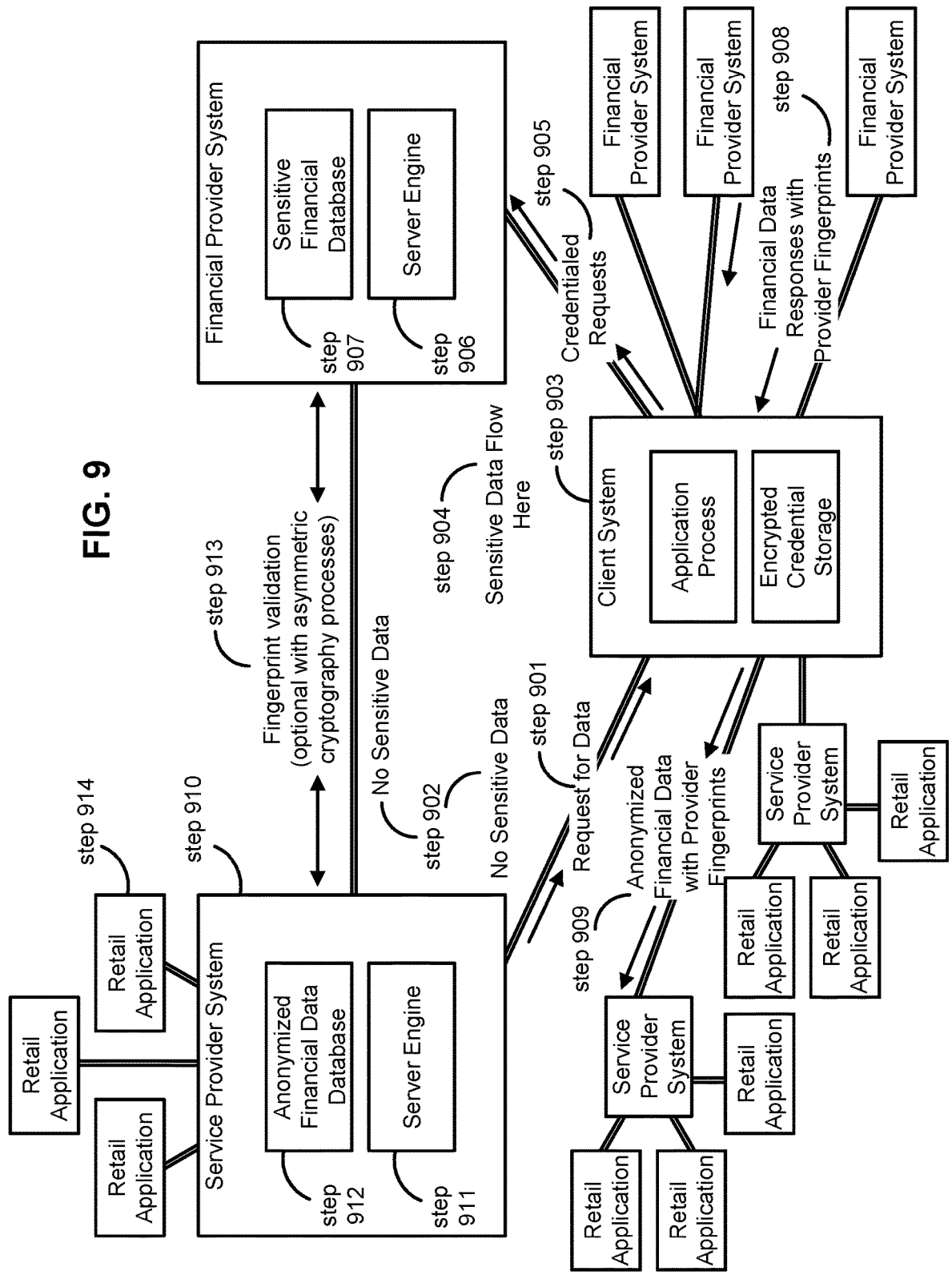
FIG. 9 illustrates an example setup/ecosystem within which aspects of this disclosure.

FIG. 9 illustrates an example setup/ecosystem 900 within which aspects of this disclosure can be implemented. FIG. 9 illustrates a user device, financial provider systems FS1, FS2, . . . FSn, service provider systems SS1, SS2, . . . SSn, and retail applications RA1, RA2, RA3, . . . RAn. The various entities in the setup 900 can be in communication as illustrated via one or more networks, each of which can be any type of network such as, for example, a local area network (LAN), a wide area network (WAN), a virtual network, a telecommunications network, and/or the internet, implemented as a wired network and/or a wireless network. Any or all communications can be secured (e.g., encrypted) or unsecured, as is known in the art.

Examples of financial services available to the user through the financial provider systems FS1, FS2, . . . FSn can include, but are not limited to, bank checking and savings accounts, brokerage stock trading accounts, cryptocurrency trading accounts, wealth management systems, and/or the like. Examples of services available to the user through the service provider systems SS1, SS2, . . . SSn can include, but are not limited to, payment systems transferring money into or out of bank accounts, data aggregation systems collecting account balance information from multiple systems, identity validation systems seeking to authenticate ownership of certain accounts and assets, and/or the like. Examples of retail entities associated with the retail applications RA1, RA2, RA3, . . . RAn can include, but are not limited to, tax software requesting transaction history from all financial sources, payment recipients wishing to receive money from a user's bank account, portfolio trackers, wealth management software, and/or the like.

Still referring to FIG. 9, described herein is general operation of the client application running on the user device within the context of the overall setup/ecosystem 900. At step 901, the system SS1 sends a request for data (e.g., in communication channels 902, that may not hide or protect (e.g., encrypt) all data or sensitive data) to the user device. The user device includes the client application itself, an encrypted local storage/database CDB, and the ability to connect to many external systems over a communication network. While the encrypted storage CDB is illustrated in FIG. 9 as separate from the client application, in some cases, the storage CDB may be a component of and/or subsumed by the client application.

In turn, the client application transmits a request and provides access credentials to the financial provider in step 904 with the credentials going to the financial provider system FS1 in step 905. The system FS1 can include a server engine 906, and a database 907 containing sensitive financial information such as the user's account(s) information. The system FS1 responds, at step 908, directly to the client system's credentialed requests with the authorized data and fingerprint/signature unique to this response data and to the financial provider system FS1. The client returns, again via a non-sensitive communication channel, the anonymized financial data and fingerprint to the system SS1 at step 909. The service provider system SS1 includes a server engine 911 and a database 912 containing the anonymized financial data it has received. The system SS1 then validates the data directly with the system FS1 if necessary and/or desirable at step 913. For example, if asymmetric cryptographic processes are used by the system FS1 in generating the fingerprint, step 913 is unnecessary. Upon successful validation, the system SS1 processes and provides, at step 914, the user's financial data as necessary and as authorized, usually to mobile and other retail applications such as the retail applications RA1-RAn.

Figure 10:
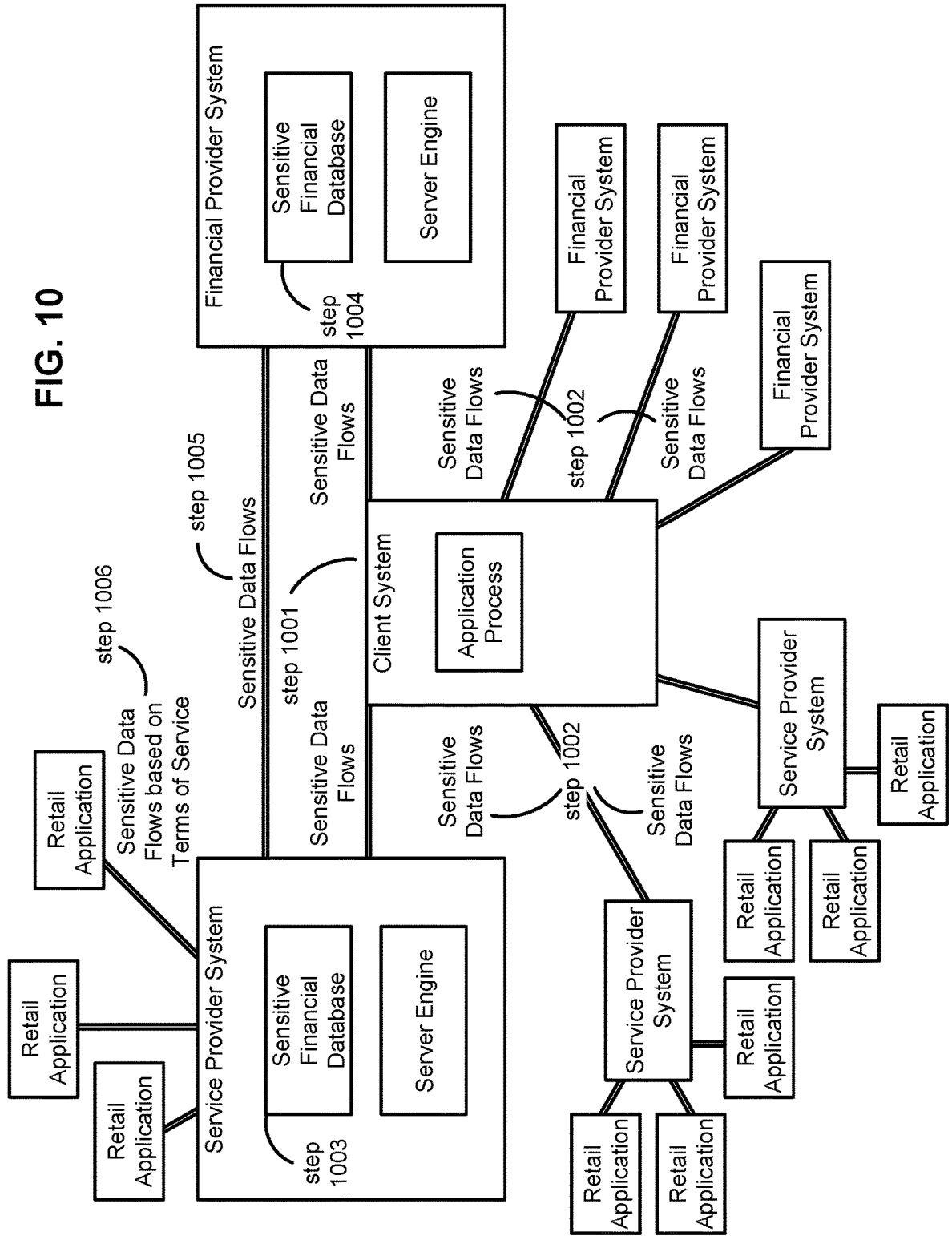
FIG. 10 illustrates operation of a user device.

In contrast, FIG. 10 illustrates operation of a user device within a conventional setup 1000. The user device in step 1001 intermediates all communication channels, with access credentials and sensitive data required in all circumstances 1002 (e.g., exchange of access credentials with both the financial provider system FS1 and the service provider system SS1). The service provider system SS1 maintains a subset of the financial provider database, including identifiable financial data and credentials 1003 and 1004. The service provider system SS1 receives accurate data from the financial provider system FS1 by sending direct requests to the system FS1 on behalf of the user, with the user's access credentials, at step 1005. In certain circumstances, sensitive data may even be passed on or sold to the retail applications if terms of service permit, at step 1006.

The user device can encompass, for example, a smartphone. The user device can execute a client application (e.g., a cloud-based application) that is a compiled executable process. In some cases, the client application can be a stand-alone application where a user associated with the user device can enter access credentials for the user's account on or with the system FS1. The access credentials can include any suitable information that permits the user to log in to, view, manage, or manipulate their user account such as, for example, a username (email, telephone number, alphanumeric string, etc.) and password, a One Time Password (OTP) token, biometric authentication information, and/or the like. In some cases, the client application logic can reside as a primarily background process/application on the user's client system which could be enacted via a stand-alone application. In some cases, the logic underlying the client application can be provided within an existing application provided by the system FS1 or the system SS1 such as, for example, via a widget. For example, in some cases, it may be desirable for the system SS1 to provide a specific application on the user device that communicates with the system SS1 and incorporates the client application logic, so as to be seen/perceived by the user as a proponent of security and privacy.

The client application can initially (e.g., upon installation, upon being launched or activated for the first time, etc.) have no configuration files to interface with any of the financial provider systems FS1-FSn, and/or with any of the service provider systems SS1-SSn. The client application can then receive (e.g., over a network) configuration files which define the interfaces the client application can employ/execute to communicate with the financial provider systems FS1-FSn over a network. For example, the configuration files can be downloaded from a package repository, and/or a distributor of the client application can include an initial set of configuration files which is loaded during software installation. In some cases, the user can develop configuration files and load them into the client application. In this manner, configuration of the client application at runtime allows the compiled application itself to ossify the source code around its core behavior. This is in contrast with preloading, or compiling configurations into the client application, which would require a new build and new distribution for any new provider(s) and interface(s) added.

In some cases, the client application can include (as separate configuration files) configurations for well-known financial and/or service provider systems, such as major financial institutions and data aggregation providers. Such interfaces/configuration files would not be compiled into the source code of the client application, but rather loaded at runtime.

The configuration files could be of any structured data format such as, for example, "YAML Ain't Markup Language" (YAML), JavaScript Object Notation (JSON), and/or the like. The network interface of each of the financial provider systems FS1-FSn can independently execute any valid network protocol such as, for example, a standard RESTful/REST API with structured JSON objects, a Remote Procedure Call (RPC) with predefined data structures, and/or the like. In this manner, the client application parses the structured data from the configuration file at runtime and executes requests to the configured interfaces of the financial provider systems FS1-FSn without requiring that they be coded directly into the client application and without having to recompile the source code of the client application, without reinstalling or rebooting the client application on the user device, and/or the like.

With reference to the financial provider system FS1 for simplicity, using the configuration file, the client application can establish a network connection with a user's account on the system FS1. This connection can be made by collecting, encrypting, storing, and using access credentials for the user account on the system FS1, provided to the client application locally at the user device by the user, to send authenticated requests through a network API exposed by the system FS1. This API can be based on the Open Banking initiative, a REST API, and/or any arbitrary interface provided by the system FS1 over its networked connection with the user device. The client application can request any suitable action regarding the user account that is permitted by the access credentials such as, for example, obtain a complete accounting of balances of the account(s) of the user (e.g., of a checking account of the user, a savings account, a business account, a credit card account, and/or the like), obtain a transaction history of one or more of the accounts, enact a payment to a vendor from the account, execute trades on the account if it is one that manages investments, provide identifiable ownership information for credit reporting, and/or the like. The system FS1 can respond with the requested data after authenticating the access credentials provided by the client application. The response data from the system FS1 can include a cryptographic version of the response data such as, for example, a SHA-256 hash of the response data (also sometimes referred to just as a "hash"). While explained herein with reference to SHA-256 hash for simplicity, it is understood that any suitable hashing techniques can be employed including, but not limited to, SHA-512, SHA-2 (i.e., a combination of SHA-512 and SHA-256), SHA-3, and/or any hash technique of a suitable size.

In some cases, the response can include a signature (e.g., a digital certificate) computed on the hash using a private key associated with the system FS1. For example, the system FS1 can create a public/private key pair based on some predefined elliptic curve, such as secp256k1 or Ed25519. The system FS1 can distribute the public key to any system that wishes to validate data from the system FS1 at a later date, such as the system SS1. When the system FS1 provides data that is proxied to the system SS1 through the user device, the system FS1 can perform this by computing a signature using the Elliptic Curve Digital Signature Algorithm (ECDSA) with the private key, and send this signature along with the data and data hash to the user device to transmit to the system SS1. The consuming system SS1 can use this response data to re-generate and validate the hash, and then use the signature to recover the unique public key associated with the system FS1's private key. If the signature was not created by the system FS1 private key, then the system SS1 would not be able to recover a public key that matches the public key associated with the system FS1 with the invalid signature. The hash is unique to the response data, and the signature can only be produced by the system FS1.

In the same manner, the client application on the same user device makes additional connections to the other financial provider systems FS2-FSn, where the user holds/has an account and retrieves account information for each. Said another way, the client application can execute this process with an arbitrary number of financial systems on behalf of the user.

With reference to the service provider system SS1 for simplicity, the client application can connect to the system SS1 in any suitable manner to provide some portion of the response data to the system SS1. For example, the client application can provide an API and/or other interface for the system SS1 to query and communicate with. As another example, the client application can connect and communicate with the system SS1 using a configuration file specific to the system SS1. As an example use case, the system SS1 can execute a portfolio aggregation application or a digital service requesting a payment through an electronic funds transfer, and with approval from the user obtained via the client application on the user device, transmit the electronic payment information received from the system FS1 to the system SS1.

The client application can connect to the system SS1 before, during, after, and/or in an overlapping manner with its connection to the one or more financial systems FS2-FSn. In some cases, the client application can stream the response data/hash received from the financial provider system(s) to the system SS1 in real time, as a batch send, at predetermined times, upon request, and/or at any arbitrary time deemed appropriate. The client application can be configured to permit the user to control what response data is made available to which of the systems SS1-SSn, e.g., to request and/or receive user approval to communicate with more than one service provider system, to identify which of the systems SS1-SSn receives which portions of the response data, and/or the like. While the data sent by the client application to the systems SS1-SSn is also referred to as response data/hash for simplicity, it is understood that this data can be different from the response data received by the client application from the systems FS1-FSn in substance (e.g., it may be only a portion of the response data from the system FS1) and/or in format (e.g., it may be formatted based on the network interface of the system SS1).

Once the system SS1 receives the hash and digital signature returned by the system FS1, it can validate the accuracy of the data with the hash, and can validate the signature against a public key associated with the system FS1. If the system SS1 can accurately validate both the hash and the signature, it can be assured that the response data received was unaltered and that it was verified by the system FS1's private key. In some cases, the response data can include metadata and/or other information which represents the scope of the response data such as, for example, timestamps for account transactions provided in the response data. Such metadata can permit the system SS1 to validate the account transactions as relevant for use by the retail application RA1, e.g., that the data is for transactions in the last 5 minutes, per RA1's request. As explained earlier, the public key can be registered as a direct agreement between the system FS1 and the system SS1 beforehand.

In some cases, the system FS1 can respond without any financial response data, but rather with a short-lived token (e.g., with a token lifetime or validity lifetime of 1 minute, 2 minutes, up to 10 minutes, including all values and sub-ranges in between) as a "Request ID" that is unique to the request from the client application and for the intended system SS1. The token can encompass but is not limited to, for example, any suitable alphanumeric string (e.g., a universally unique identifier or UUID).

This token can then be forwarded by the client application to the system SS1, and the system SS1 can then directly communicate with the system FS1 using the token to request information associated with the user account(s) from the system FS1. In this manner, the system FS1 can validate the origin of the system SS1's request, along with the token, and then provide the response data for the original request (from the client application to the system FS1) directly to the system SS1. With this approach, the user's account/financial data is shared directly between the service provider system SS1 and the financial provider system FS1, yet the asset owner's credentials never leave the local environment, i.e., the client application and/or the user device.

The ultimate utility of the service provider system SS1 can be to communicate with and receive data from the financial provider system FS1 to facilitate organized communication between retail applications RA1-RAn being used by the user and the user's financial accounts with the system FS1. In a real-world scenario, the user usually has a purpose when using the retail application, such as portfolio tracking or budgeting, and the retail application(s) in turn utilize the system SS1 to facilitate the communication to and from the system FS1 so that the retail application(s) can have the necessary data to provide their desired functionality to the user.

Figure 11:
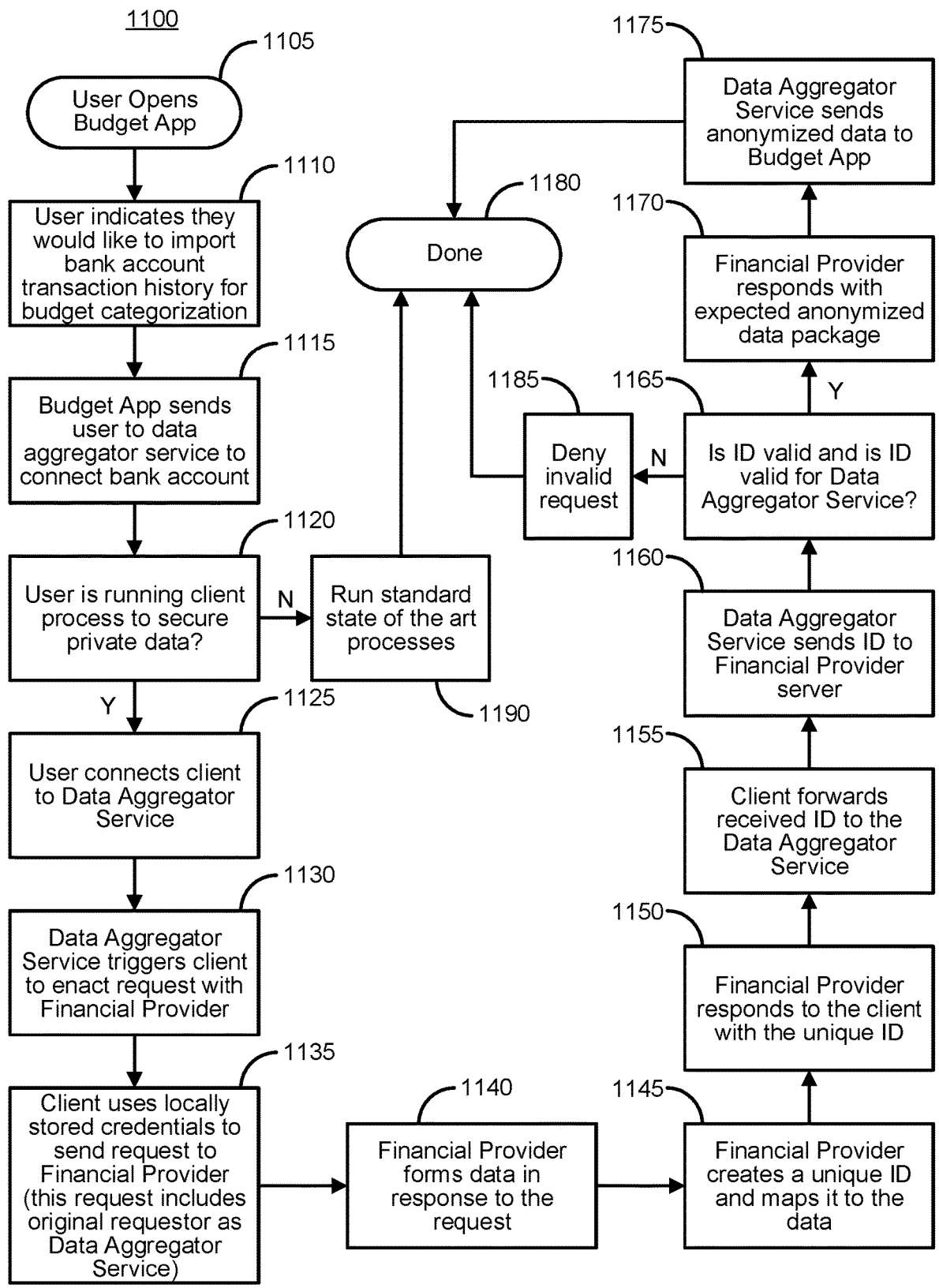
FIG. 11 illustrates an example method from the perspective of the user opening a retail application.

FIG. 11 illustrates an example method 1100 from the perspective of the user opening a retail application (e.g., the retail application RA1) on the user device with the purpose of providing that application some financial data. In this case, the retail application is a budgeting application that has a partnership with some arbitrary financial data aggregator and directs the user to a data aggregator service (e.g., the service provider system SS1).

At step 1105, the user opens/initiates the budgeting application ("Budget App," e.g., an example retail application), such as on the user device, and at step 1110, authorizes or instructs the budgeting application to extract the user's bank account transaction history (e.g., from the system FS1). At step 1115, the Budget App sends a request to a data aggregator service (e.g., the system SS1) that the Budget App uses to obtain this financial information. The data aggregator service is able to determine the initial details of this redirection because the Budget App includes initial information, such as the Budget App's customer ID with the data aggregator service. The redirection and the data aggregator service provide the user with a prompt based on this information at an interface of the data aggregator service such as, for example, a mobile application provided by the data aggregator service and installed on the client's mobile device/system, a web browser-based interface/portal provided by the data aggregator service and accessed by the user from within a web browser application installed on the user device.

At step 1120, the prompt asks if the user is using a secure client application (e.g., the client application). If the user indicates they are not using a secure client application, the data aggregator service continues with a standard workflow at step 1190 which involves the user being asked to give the data aggregator service the access credentials to the user's financial account directly. At step 1125, after the user has indicated they are running a secure client application, the data aggregator service provides the user a connection method, such as a URL, to the data aggregator service server. At step 1130, after the client application has successfully connected to the data aggregator service server, the data aggregator service initiates the request intended for the financial provider associated with the user's financial account, to obtain the financial data needed by the Budget App.

At step 1135, the client application retrieves the locally stored access credentials (e.g., in the storage CDB) for the target financial provider and sends the request along with additional information that identifies the data aggregator service as the initiator to the financial provider system. The financial provider validates the user's credentials and request and at step 1140, forms the response data (e.g., the financial data requested by the Budget App). At step 1145, the financial provider generates a unique ID, such as a UUID, maps the response data to this ID, and marks this mapping such that it is intended for the data aggregator service. The financial provider can keep the response data and store the mapping of UUID to this response data in a temporary storage, such as a cache with a 5-minute time to live (TTL). In this manner, the response data and ID will be completely dropped from the financial provider system after 5 minutes and a new request will be needed if the data is not retrieved before then.

At step 1150, the financial provider sends the UUID to the client application/system. At step 1155, the client forwards this "response" UUID to the data aggregator service. At step 1160, the data aggregator service transmits the UUID directly to the financial provider, i.e., without involving or being routed through the client system/application. The data aggregator service can include its own set of credentials to the financial provider during this transmission. At step 1165, the financial provider validates the credentials for the data aggregator service, then locates the temporarily stored data that is mapped to the given UUID now provided by the data aggregator service. The financial provider also validates that this data is in fact meant to be distributed to the data aggregator service. If the credentials fail, the UUID no longer exists, or the data set is not authorized for the data aggregator service, the request will be denied at step 1185. At step 1170, the financial provider will respond to the data aggregator service with the data generated in response to the initial request from the client system. At step 1175, the data aggregator service sends the received data to the Budget App for its intended purpose/use, between the user and the Budget App.

Figure 12:
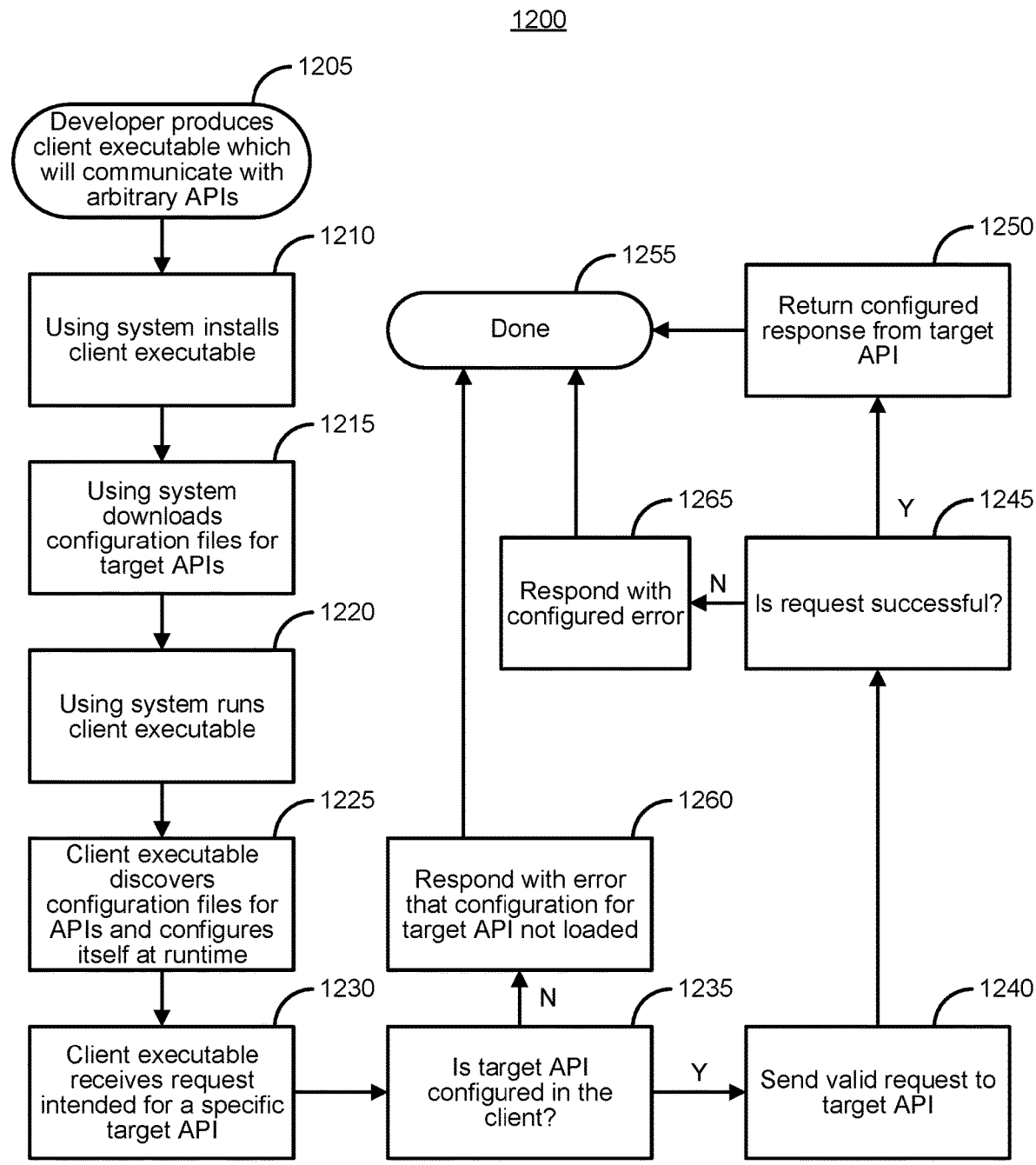
FIG. 12 illustrates an example method for configuring a client application executing on a client system.

FIG. 12 illustrates an example method 1200 for configuring a client application executing on a client system (e.g., the user device). At step 1205, a developer can develop, produce, and/or generate the client application/client executable that is configured to communicate with any API, such as those of systems like FS1, SS1, and/or the like. At step 1210, a user installs the client application on their computing system, such as a mobile phone or desktop computer. At step 1215, the client application downloads configuration files which will configure the installed client application to communicate with the APIs contained within the given configurations. At step 1220, the user starts/launches/executes the client application on the computing system. At step 1225, the client application seeks configuration files for target APIs (e.g., based on a search algorithm programmed by the application developer, for target financial provider systems), and loads the configurations. At step 1230, the client application receives a request to execute a call to a target API system (e.g., from the service provider system SS1). At step 1235, the client application determines whether an API for the target system was included in the configurations previously loaded. If the API is not included, the client application responds with an error at step 1260. At step 1240, the client application executes the call/request for financial data to the target system via its API. At step 1245, the client application determines if the response to the call is successful. If the call was not successful, the client application sends an error response to the initial requester at step 1265. If the call is successful, then at step 1250, the client application sends a response that is defined in the configuration, for this specific call, to the initial requestor.

The method of FIG. 12 is representative of configuring any client application on a user's computational device, and can be included in any network/networking system with API-based communications. The current state of the art for developing client API systems includes engineers reading interface documentation and developing these interfaces into their client applications at compile time, before runtime, sometimes utilizing Software Development Kits (SDKs) written in their client's programming language. For instance, a JavaScript application may utilize "Stripe.js" to build a client application which communicates with Stripe's API. This client application does not include any one specific interface at compile time, but rather, reads configuration files at runtime to configure itself for any arbitrary API. An example YAML structured configuration file can be seen in FIG. 13.

Modification within the spirit of the systems and methods disclosed herein will be apparent to those skilled in the art. For example, retail applications could build interfaces capable of sending and receiving data with the client system directly. Financial provider systems could produce fingerprints for datasets using various, unmentioned processes. Both service provider systems and financial provider systems could enable interfaces in the client application through dynamic automated loading, and they could load permission settings in the client application dynamically by utilizing the communication network. The client application and financial provider systems could coordinate to filter the eventual dataset going to the service provider system to meet the exact need of the request and no more, as well as establish granular permissions and data scopes for each request and/or each service provider system. Client applications utilizing the runtime configuration process could be embedded in server systems which themselves act as client applications/systems to other server APIs. The client configuration files themselves could be of any structured, machine-readable format such as JSON, XML, or YAML.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising receiving, at a user device associated with a user, a request for account data associated with the user from a repository network system over a communication network; transmitting, by the user device to a source network system, a request for the account data and access credentials associated with an account of the user with the source network system; receiving, at the user device from the source network system, response data and a unique fingerprint that validates the accuracy and source of the response data; and transmitting, from the user device to the repository network system, the response data and the fingerprint, wherein the user device does not transmit the access credentials to the repository network system.

2. The method of any one of the preceding embodiments, further comprising validating, at the repository network system and in communication with the source network system, the accuracy and source of the response data without exchanging the access credentials therebetween.

3. The method of any one of the preceding embodiments, wherein the source network system is a first source network system, and the user device is communicably coupled to a plurality of source network systems including the first source network system.

4. The method of any one of the preceding embodiments, wherein the repository network system is a first repository network system and the user device is communicably coupled to a plurality of repository network systems including the first repository network system.

5. The method of any one of the preceding embodiments, the transmitting the response data and the fingerprint including transmitting the fingerprint and at least a portion of the response data to a subgroup of repository network systems of the plurality of repository network systems without transmitting the access credentials to any of the subgroup of repository network systems.

6. A method, the method comprising: receiving, at the client application, a plurality of API configuration files; parsing, by the client application, the plurality of configuration files to identify a corresponding plurality of target APIs associated with systems external to the user device, such that the client application can be communicably coupled to each target API based on its corresponding configuration file; establishing successful communicable connectivity with at least one target API based on its corresponding configuration file; receiving, from a service system, a request for data from a system associated with the at least one target API; transmitting, via the at least one API, the request for the data to the system associated with that at least one target API; receiving, responsive to the transmitting, response data from the system associated with the at least one target API; configuring the response data based on the configuration file associated with the at least one target API to generate a configured response; and transmitting the configured response to the service system.

7. The method of any one of the preceding embodiments, wherein the source code of the user device does not include a specification of any target API of the plurality of target APIs.

8. The method of any one of the preceding embodiments, further comprising searching, by the client application via a network that the client application is coupled to, for valid configuration files, wherein the receiving is responsive to the searching.

9. The method of any one of the preceding embodiments, further comprising configuring the network API of the client application based on the corresponding configuration file associated with the at least one target API.

10. A method, the method comprising: receiving, at a user device from a repository network system, a first request for user data from a source network system, wherein the user data is accessible to the user device based on access credentials implemented on the user device; parsing, by a client application on the user device, a plurality of configuration files to determine a corresponding plurality of source APIs, wherein each of the plurality of source APIs corresponds to a respective source network system external to the user device; determining a source API of the plurality of source APIs based on a configuration file of the plurality of configuration files that corresponds to the source API; configuring a network API of the client application based on the configuration file; establishing successful communicable connectivity with the source network system using the source API; generating, by the client application, a second request based on the first request, the access credentials, and the source API; transmitting, by the client application, the second request for the data to the source network system; in response to transmitting the second request for the data to the source network system, receiving first response data from the source network system; generating, based on the configuration file, second response data; and transmitting the second response data to the repository network system.

11. The method of any one of the preceding embodiments, wherein the plurality of API configuration files are received during software installation of the client application on the client device.

12. The method of any one of the preceding embodiments, wherein the configuration file comprises a hierarchical list of variables for generating the second request based on the first request, and wherein the variables comprise key value pairs that belong to a RuntimeConfig resource for the client application.

13. The method of any one of the preceding embodiments, wherein the source code of the user device does not include a specification of any source API of the plurality of source APIs.

14. The method of any one of the preceding embodiments, further comprising: searching, by the client application, via a network that the client application is coupled to, for valid configuration files, wherein the plurality of API configuration files is received in response to the searching.

15. The method of any one of the preceding embodiments, further comprising: receiving, at the user device, the client application; and receiving, by the client application, the plurality of API configuration files.

16. The method of any one of the preceding embodiments, wherein the second request comprises a request from the user device for account data and access credentials associated with an account of the user with the source network system.

17. The method of any one of the preceding embodiments, wherein the repository network system validates an accuracy and a source of the second response data without exchanging the access credentials with the source network system.

18. The method of any one of the preceding embodiments, wherein the repository network system validates the accuracy and the source of the second response data via direct communication to the source network system.

19. The method of any one of the preceding embodiments, wherein the first response data comprises a unique fingerprint that validates an accuracy and a source of the first response data.

20. The method of any one of the preceding embodiments, wherein the repository network system and the user device is communicably coupled to a plurality of source network systems.

21. A tangible, non-transitory, machine-readable medium storing instructions that, when executed by a data processing apparatus, cause the data processing apparatus to perform operations comprising those of any of embodiments 1-20.

22. A system comprising one or more processors; and memory storing instructions that, when executed by the processors, cause the processors to effectuate operations comprising those of any of embodiments 1-20.

23. A system comprising means for performing any of embodiments 1-20.

What is claimed is:

1. A system for fetching, securing, and controlling private credentials over a disparate communication network without recompiling source code by configuring, at runtime, a network application programming interface (API) of client applications executing on user devices, the system comprising:
one or more processors; and
a non-transitory, computer-readable medium, comprising instructions that, when executed by the one or more processors, cause operations comprising:
receiving, at a user device from a repository network system, a first request for user data from a source network system, wherein the user data is accessible to the user device based on access credentials implemented on the user device, and wherein the user data comprises a blockchain operation corresponding to a first cryptography-based storage application corresponding to a user account accessible to the user device;
parsing, by a client application on the user device, a plurality of configuration files to determine a corresponding plurality of source APIs, wherein each of the plurality of source APIs corresponds to a respective source network system external to the user device;
determining a source API of the plurality of source APIs based on a configuration file of the plurality of configuration files that corresponds to the source API;
configuring a network API of the client application based on the configuration file;
establishing successful communicable connectivity with the source network system using the source API;
generating, by the client application, a second request based on the first request and the source API;
transmitting, by the client application, the second request for the user data to the source network system;
in response to transmitting the second request for the user data to the source network system, receiving first response data from the source network system;
generating, based on the configuration file, second response data; and
transmitting the second response data to the repository network system, wherein the repository network system validates an accuracy and a source of the second response data without exchanging the access credentials with the source network system.

2. A method for fetching, securing, and controlling private credentials over a disparate communication network without recompiling source code by configuring, at runtime, a network application programming interface (API) of client applications executing on user devices, the method comprising:
receiving, at a user device from a repository network system, a first request for user data from a source network system, wherein the user data is accessible to the user device based on access credentials implemented on the user device;
parsing, by a client application on the user device, a plurality of configuration files to determine a corresponding plurality of source APIs, wherein each of the plurality of source APIs corresponds to a respective source network system external to the user device;
determining a source API of the plurality of source APIs based on a configuration file of the plurality of configuration files that corresponds to the source API;
configuring a network API of the client application based on the configuration file;
establishing successful communicable connectivity with the source network system using the source API;
generating, by the client application, a second request based on the first request, the access credentials, and the source API;
transmitting, by the client application, the second request for the user data to the source network system;
in response to transmitting the second request for the user data to the source network system, receiving first response data from the source network system;
generating, based on the configuration file, second response data; and
transmitting the second response data to the repository network system.

3. The method of claim 2, wherein the plurality of API configuration files are received during software installation of the client application on the user device.

4. The method of claim 2, wherein the configuration file comprises a hierarchical list of variables for generating the second request based on the first request, and wherein the variables comprise key value pairs that belong to a RuntimeConfig resource for the client application.

5. The method of claim 2, wherein source code of the user device does not include a specification of any source API of the plurality of source APIs.

6. The method of claim 2, further comprising:
searching, by the client application, via a network that the client application is coupled to, for valid configuration files, wherein the plurality of API configuration files is received in response to the searching.

7. The method of claim 2, further comprising:
receiving, at the user device, the client application; and
receiving, by the client application, the plurality of API configuration files.

8. The method of claim 2, wherein the second request comprises a request from the user device for account data and access credentials associated with an account of the user with the source network system.

9. The method of claim 2, wherein the repository network system validates an accuracy and a source of the second response data without exchanging the access credentials with the source network system.

10. The method of claim 9, wherein the repository network system validates the accuracy and the source of the second response data via direct communication to the source network system, and wherein the first response data comprises a unique fingerprint that validates an accuracy and a source of the first response data.

11. The method of claim 2, wherein the repository network system and the user device are communicably coupled to a plurality of source network systems.

12. A non-transitory, computer-readable medium, comprising instructions that, when executed by one or more processors, cause operations comprising:
- receiving, at a user device from a repository network system, a first request for user data from a source network system, wherein the user data is accessible to the user device based on access credentials implemented on the user device;
- parsing, by a client application on the user device, a plurality of configuration files to determine a corresponding plurality of source APIs, wherein each of the plurality of source APIs corresponds to a respective source network system external to the user device;
- determining a source API of the plurality of source APIs based on a configuration file of the plurality of configuration files that corresponds to the source API;
- configuring a network API of the client application based on the configuration file;
- establishing successful communicable connectivity with the source network system using the source API;
- generating, by the client application, a second request based on the first request, the access credentials, and the source API;
- transmitting, by the client application, the second request for the user data to the source network system;
- in response to transmitting the second request for the user data to the source network system, receiving first response data from the source network system;
- generating, based on the configuration file, second response data; and
- transmitting the second response data to the repository network system.

13. The non-transitory, computer-readable medium of claim 12, wherein the plurality of configuration files are received during software installation of the client application on the user device.

14. The non-transitory, computer-readable medium of claim 12, wherein the configuration file comprises a hierarchical list of variables for generating the second request based on the first request, and wherein the variables comprise key value pairs that belong to a RuntimeConfig resource for the client application.

15. The non-transitory, computer-readable medium of claim 12, wherein a source code of the user device does not include a specification of any source API of the plurality of source APIs.

16. The non-transitory, computer-readable medium of claim 12, further comprising:
- searching, by the client application, via a network that the client application is coupled to, for valid configuration files, wherein the plurality of configuration files is received in response to the searching.

17. The non-transitory, computer-readable medium of claim 12, further comprising:
- receiving, at the user device, the client application; and
- receiving, by the client application, the plurality of configuration files.

18. The non-transitory, computer-readable medium of claim 12, wherein the second request comprises a request from the user device for account data and access credentials associated with an account of a user with the source network system.

19. The non-transitory, computer-readable medium of claim 12, wherein the repository network system validates an accuracy and a source of the second response data without exchanging the access credentials with the source network system.

20. The non-transitory, computer-readable medium of claim 18, wherein the repository network system validates an accuracy and a source of the second response data via direct communication to the source network system, and wherein the first response data comprises a unique fingerprint that validates an accuracy and a source of the first response data.

* * * * *